(12) United States Patent
Vogl et al.

(10) Patent No.: US 8,090,841 B2
(45) Date of Patent: *Jan. 3, 2012

(54) METHOD OF DOING BUSINESS OVER A NETWORK BY TRANSMISSION AND RETRANSMISSION OF DIGITAL INFORMATION ON A NETWORK DURING TIME SLOTS

(75) Inventors: Norbert George Vogl, Mahopac, NY (US); Geoffrey Hale Purdy, Roxbury, CT (US); Robert Alan Flavin, Yorktown Heights, NY (US); Yuan Feng, White Plains, NY (US); Edward Payson Clarke, Jr., Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 463 days.

This patent is subject to a terminal disclaimer.

(21) Appl. No.: 12/170,834

(22) Filed: Jul. 10, 2008

(65) Prior Publication Data

US 2008/0317026 A1 Dec. 25, 2008

Related U.S. Application Data

(63) Continuation of application No. 09/649,973, filed on Aug. 29, 2000, now Pat. No. 7,403,994.

(51) Int. Cl.
*G06F 15/16* (2006.01)
*G06F 15/173* (2006.01)

(52) U.S. Cl. ........ 709/227; 709/202; 709/223; 709/224; 370/230; 370/468; 718/102

(58) Field of Classification Search .......... 709/201–203, 709/223–224, 227–229; 718/102, 107; 370/230, 370/468
See application file for complete search history.

(56) References Cited

U.S. PATENT DOCUMENTS

| | | | |
|---|---|---|---|
| 4,642,758 A | 2/1987 | Teng | 364/200 |
| 5,287,194 A | 2/1994 | Lobiondo | 358/296 |
| 5,412,031 A | 5/1995 | Ma et al. | 525/98 |
| 5,515,379 A * | 5/1996 | Crisler et al. | 370/347 |
| 5,574,934 A | 11/1996 | Mirashrafi et al. | 395/800 |
| 5,581,369 A | 12/1996 | Righter et al. | 358/442 |
| 5,623,606 A | 4/1997 | Yokoyama et al. | 395/250 |
| 5,640,504 A | 6/1997 | Johnson, Jr. | 714/4 |
| 5,701,582 A | 12/1997 | DeBey | 725/103 |
| 5,729,540 A | 3/1998 | Wegrzyn | 370/336 |
| 5,737,009 A | 4/1998 | Payton | 348/7 |
| 5,745,694 A | 4/1998 | Egawa et al. | 395/200.55 |
| 5,790,198 A | 8/1998 | Roop et al. | 725/48 |
| 5,819,094 A | 10/1998 | Sato et al. | 717/131 |
| 5,875,175 A | 2/1999 | Sherer et al. | 370/230 |
| 5,903,724 A * | 5/1999 | Takamoto et al. | 709/200 |
| 5,907,556 A | 5/1999 | Hisanaga et al. | 370/468 |

(Continued)

*Primary Examiner* — Bharat Barot
(74) *Attorney, Agent, or Firm* — Harrington & Smith

(57) ABSTRACT

The present invention is a method of doing business over a network that: receives a request for transmitting digital information after a start time and before an end time, determines the time required to transmit the digital information based on the number of packets in the information and the network speed, schedules a transmit time for the digital information, and accepts the digital information for transmission only if the time required to transmit is less than or equal to the difference between the transmit time and the end time. Pricing of the transmission can be determined by the priority of transmission, whether the information is transmitted the first time or rescheduled, and whether the user receives an acknowledgment.

23 Claims, 17 Drawing Sheets

U.S. PATENT DOCUMENTS

| | | | |
|---|---|---|---|
| 5,920,701 A | 7/1999 | Miller et al. | 709/228 |
| 6,014,651 A | 1/2000 | Crawford | 705/400 |
| 6,122,280 A | 9/2000 | Hamai et al. | 370/395 |
| 6,134,596 A | 10/2000 | Bolosky et al. | 709/233 |
| 6,240,460 B1 | 5/2001 | Mitsutake et al. | 709/235 |
| 6,243,755 B1 | 6/2001 | Takagi et al. | 709/229 |
| 6,330,603 B1 | 12/2001 | Seki et al. | 709/226 |
| 6,353,844 B1 | 3/2002 | Bitar et al. | 709/102 |
| 6,373,929 B1 | 4/2002 | Johnson et al. | 379/114.02 |
| 6,374,336 B1 | 4/2002 | Peters et al. | 711/167 |
| 6,374,405 B1 * | 4/2002 | Willard | 725/94 |
| 6,430,160 B1 | 8/2002 | Smith et al. | 370/252 |
| 6,453,316 B1 | 9/2002 | Karibe et al. | 707/8 |
| 6,543,053 B1 | 4/2003 | Li et al. | 725/88 |
| 6,564,382 B2 * | 5/2003 | Duquesnois et al. | 725/100 |
| 6,615,262 B2 | 9/2003 | Schweitzer et al. | 709/224 |
| 6,701,299 B2 | 3/2004 | Kraisser et al. | 705/8 |
| 6,701,372 B2 | 3/2004 | Yano et al. | 709/232 |
| 6,738,380 B1 | 5/2004 | Imai et al. | 370/395.42 |
| 6,738,972 B1 | 5/2004 | Willard et al. | 718/103 |
| 6,920,148 B1 | 7/2005 | Kato | 370/442 |
| 6,959,327 B1 | 10/2005 | Vogl et al. | 709/219 |
| 6,986,156 B1 | 1/2006 | Rodriguez et al. | 725/95 |
| 7,116,639 B1 * | 10/2006 | Gail et al. | 709/224 |
| 7,194,261 B2 | 3/2007 | Emcott et al. | 455/426.2 |
| 7,403,994 B1 * | 7/2008 | Vogl et al. | 709/227 |
| 7,411,908 B2 * | 8/2008 | Liu et al. | 370/232 |
| 7,467,382 B2 * | 12/2008 | Watanabe | 718/102 |
| 7,830,890 B2 * | 11/2010 | Vogl et al. | 709/227 |
| 2002/0095636 A1 * | 7/2002 | Tatsumi et al. | 370/229 |
| 2003/0065805 A1 | 4/2003 | Barnes, Jr. | 709/231 |

* cited by examiner

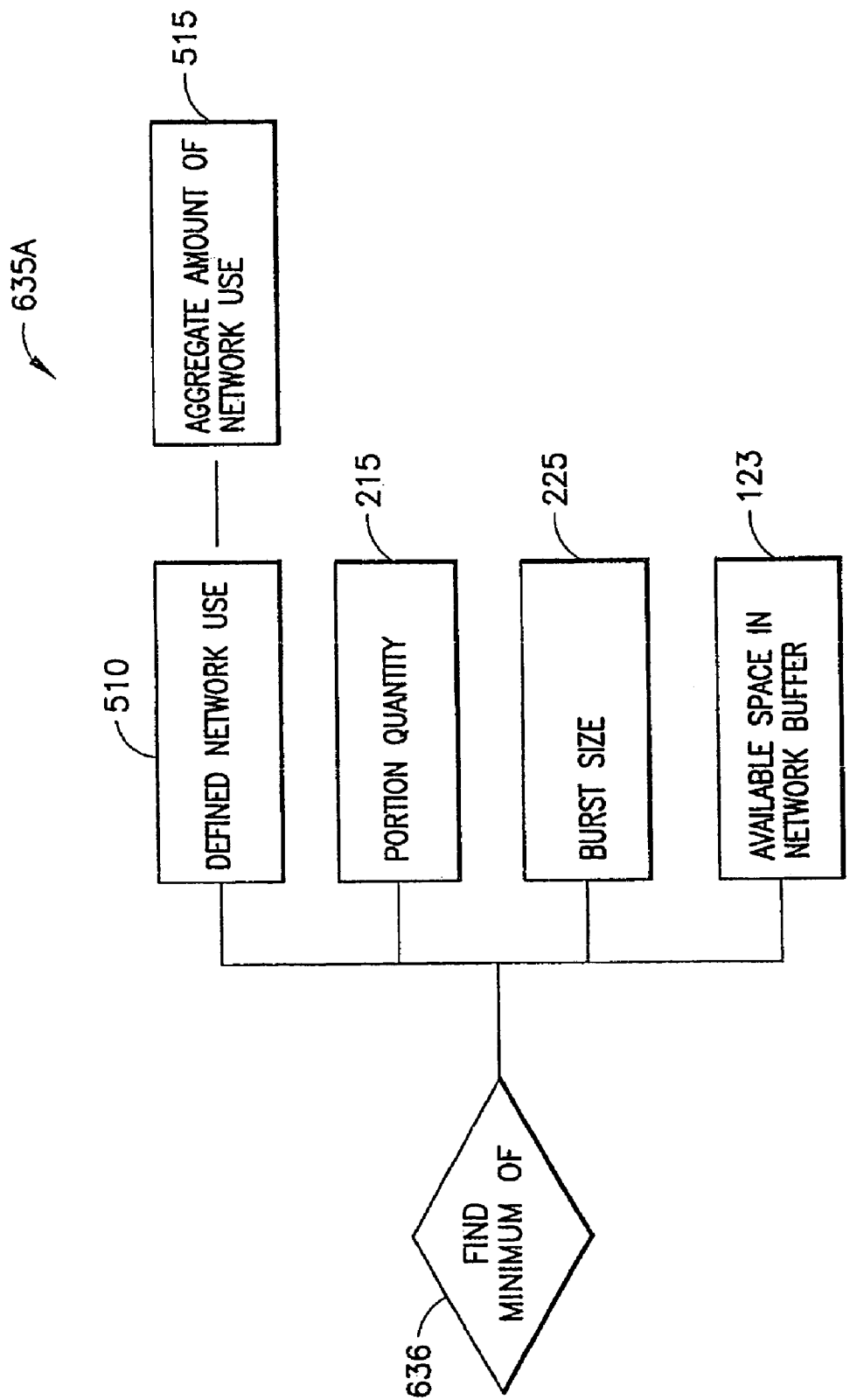

DELIVERY CRITERIA LIST, 114

| | FILE IDENTIFIER | SIZE | RELEASE TIME | DEADLINE | RECIPIENTS | ACK | BANDWIDTH | RETRANS |
|---|---|---|---|---|---|---|---|---|
| 914A | training.mpg | 3.6GB | 21:00 FRI. | 23:00 FRI. | B, D | YES | 10 Mbps | 2 |
| 914B | training.mpg | 3.6GB | 21:30 FRI. | 23:00 FRI. | B, D | YES | 10 Mbps | 1 |
| 914C | training.mpg | 3.6GB | 22:00 FRI. | 23:00 FRI. | B, D | YES | 10 Mbps | 0 |
| 914D | rulesUpdate.zip | 375MB | 21:30 FRI. | 22:00 FRI. | A, B | NO | 5 Mbps | 0 |
| 914E | catalog.zip | 750MB | 22:00 FRI. | 22:30 FRI. | C | NO | 10 Mbps | 0 |

FIG.9A

METHOD OF DOING BUSINESS OVER A NETWORK BY TRANSMISSION AND RETRANSMISSION OF DIGITAL INFORMATION ON A NETWORK DURING TIME SLOTS

CROSS REFERENCE

This patent application is a continuing application of U.S. application Ser. No. 09/649,973, filed Aug. 29, 2000, now U.S. Pat. No. 7,403,994 the disclosure of which is incorporated by reference in its entirety.

FIELD OF THE INVENTION

This invention relates to the field of practicing a business method over a network. More specifically, this invention relates to the business of dispatching and scheduling the transmission of a information over a network.

BACKGROUND OF THE INVENTION

With the increased popularity and usage of the Internet and World Wide Web, computers are used to distribute data files (which are often large in size) over digital networks. These data files include electronic mail addressed to individuals and/or groups of people, postings for electronic bulletin boards (e.g. the usenet), pages from World Wide Web servers, audio files (encoded with MP3), video files, digital images, digitized books and diagrams, and updates and errata of digitized books and other documentation. In general, network computing is well known. For example, see U.S. Pat. No. 5,371,852 to Attanasio et al. issued on Dec. 6, 1994. This patent is herein incorporated by reference in its entirety.

For example, an insurance company may transmit many different forms of digital data to their insurance agents. The company may produce training videos and audio tapes which are digitized into video and audio data files. It may also publish its rules and regulations in digital form as web pages or digital books. Updated actuarial tables and insurance prices may be transmitted periodically. And the insurance company may use e-mail to communicate with the agents as a whole or individually. The size of these data files can vary greatly and clearly, some data files are more important than others and need to be transmitted at a higher priority or otherwise in a controlled manner. Currently, much of the prior art does not use the priority and size of documents to determine how the documents are transmitted over a network.

While many techniques and tools are used in scheduling real-time tasks for computer central processing units (CPUs), these techniques have not been applied to scheduling transmissions of data files over a network. In a real-time operating system, a computer has many jobs to run, each of which has a release time, deadline, worst-case running time, and optionally a period. The scheduler of the real-time operating system examines these job constraints and devises a schedule which allows the computers CPU(s) to operate the tasks to completion and meet the release and deadline constraints if the constraints taken as a whole are feasible. Some real-time operating system schedulers also have the ability to discard jobs on a priority basis in the event that a feasible schedule cannot be computed for the entire job set. Two well known scheduling algorithms for computing a real-time job schedule are the Earliest Deadline First (EDF) algorithm and the Rate Monotonic (RM) algorithm.

STATEMENT OF PROBLEMS WITH THE PRIOR ART

However, CPU scheduling is different than bandwidth scheduling. Bandwidth availability can vary over time—number and speed of CPU processors are constant over time. Temporary bursty congestion on network may also slow or choke data transmission. Current TCP/IP file transmission packages (FTP, HTTP) do not support scheduled pacing and preemption of data flow. TCP/IP stack and network is available only on a "first come, first served" basis. FTP and HTTP do not have scheduling capabilities to start sending the file at a given time (they just start "now").

Further, it would be desirable in some instances, that transmissions over a digital network be sent with priorities and staggered at different data rates and bursts.

Also, Quality of Service scheduling within routers and switches provides bandwidth constraints either at a packet by packet or cell by cell level. This scheduling is not applicable to multi-megabyte or gigabyte files. Queue length and other buffer resources within switches and routers are severely constrained. (In this disclosure, "packet" is used to describe any sub unit of information transmitted over a network, without the loss of generality.)

In addition, limitations of computer networks include bandwidth constraints, limited availability of shared bandwidth, network congestion, the speed of intermediate network devices (such as routers, switches, bridges, and proxy servers), and data loss to network errors.

The prior art has not adequately addressed delivering information over a network during specified time intervals.

The prior art has not been able to apply scheduling or dispatching techniques to deal with: priority information; staggered information; quality of service; queue length and buffer constraints; bandwidth constraints; and information delivery during specific time intervals. Nor has the prior art developed adequate business methods for dealing with information transmission subject to these constraints over a network.

OBJECTS OF THE INVENTION

An object of this invention is an improved business method for scheduling, dispatching, and/or transmitting information over a network.

An object of this invention is an improved business method for scheduling, dispatching, and/or transmitting information at a specific price over a network.

SUMMARY OF THE INVENTION

The present invention is a method of doing business over a network that: receives a request for transmitting digital information after a start time and before an end time, determines the time required to transmit the digital information based on the number of packets in the information and the network speed, schedules a transmit time for the digital information, and accepts the digital information for transmission only if the time required to transmit is less than or equal to the difference between the transmit time and the end time. Pricing of the transmission can be determined by the priority of transmission, whether the information is transmitted the first time or rescheduled, and whether the user receives an acknowledgment.

BRIEF DESCRIPTION OF THE DRAWINGS

The foregoing and other objects, aspects and advantages will be better understood from the following detailed description of preferred embodiments of the invention with reference to the drawings that are include the following:

FIG. 6a is a flow chart of an amount-to-write computation process.

FIG. 9a is a block diagram showing sample records in a delivery criteria list.

DETAILED DESCRIPTION OF THE INVENTION

The present invention is a business method for doing business over a network by transmission and retransmission of digital information on a network during time slots. However, the description below also includes scheduler and dispatcher inventions that enable the business method in a preferred embodiment. These inventions are further described and claimed in U.S. patent application Nos. 09/649,954 and 09/649,953, entitled "System and Method for Dispatching and Scheduling Network Transmissions with Feedback" and "System and Method for Scheduling Digital Information Transmission and Retransmission on a Network During Time Slots", respectively, to Vogl, et al. which were filed on the same day as this invention and which are herein incorporated by reference in their entirety.

Figure 1:
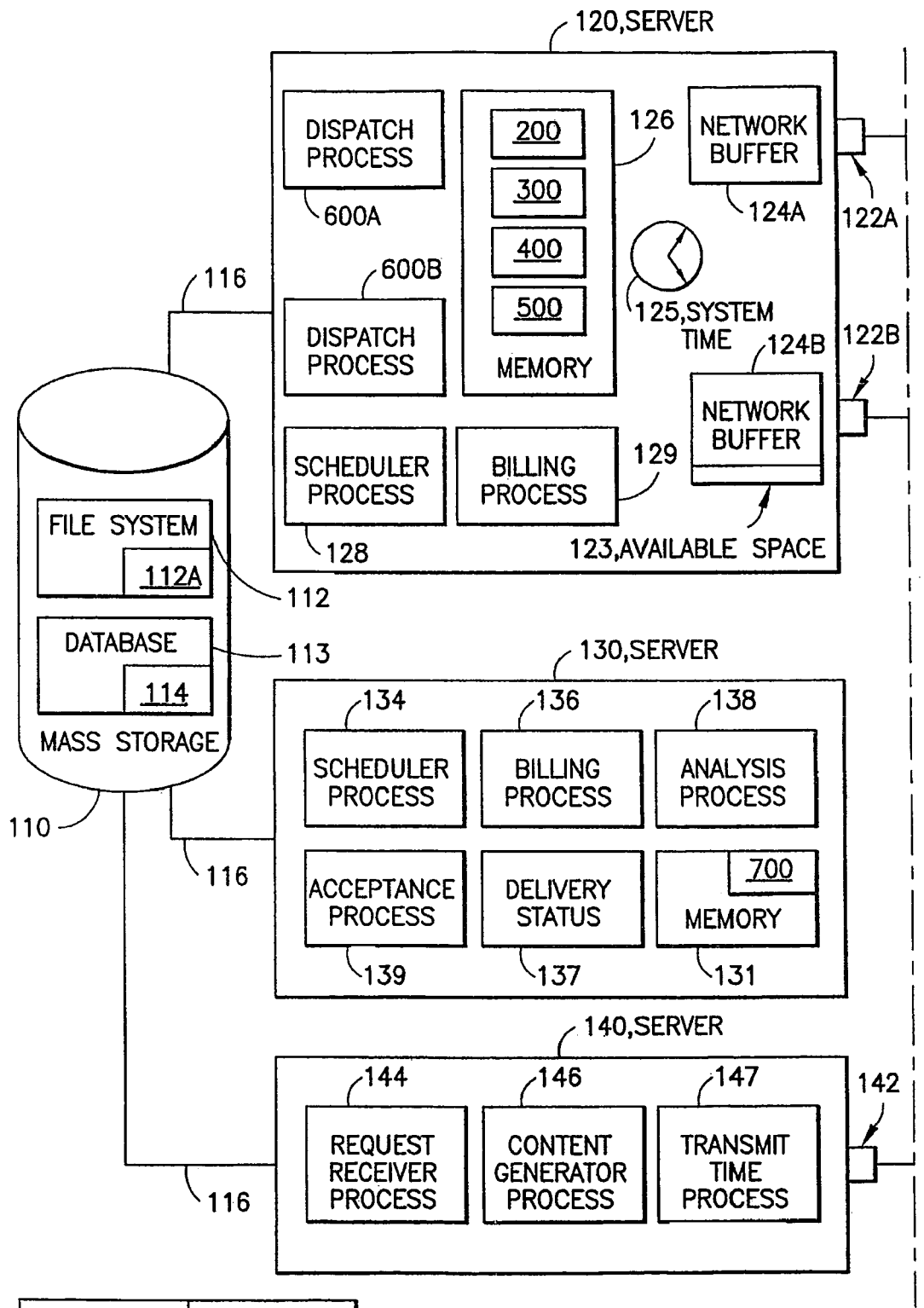
FIG. 1 is a block diagram of a system for requesting and transmitting data files using the present invention.
Figure 1B:
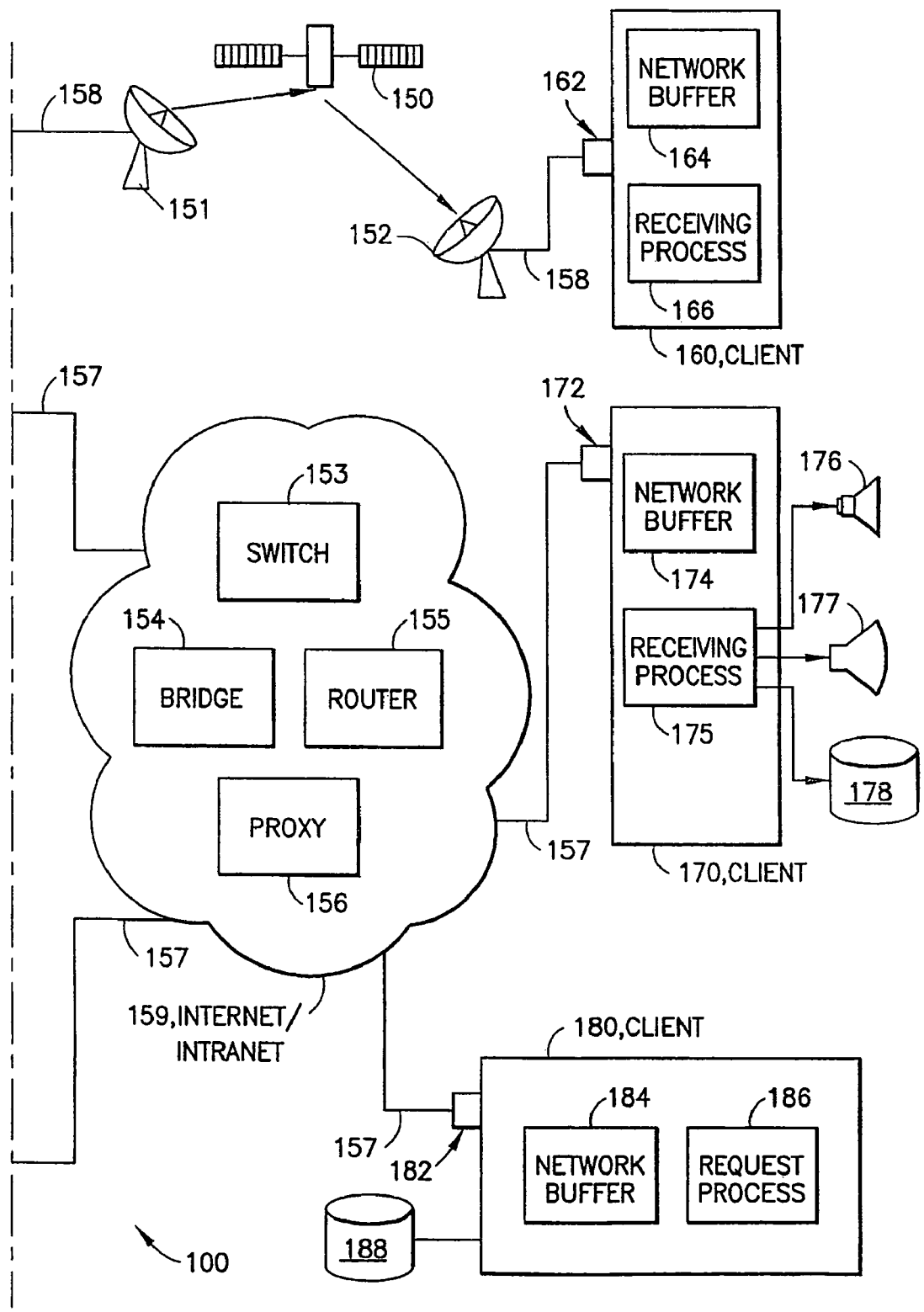

FIG. 1 is a block diagram of a system 100 containing one or more computer network dispatching process 600 (e.g. 600A, 600B). The system contains one or more servers (120, 130, and 140) which read information from one or more mass storage devices 110 and transmit the information over network 159 and/or other transmission means such as a radio/frequency transmitter and/or satellite 150 to one or more clients (160, 170, 180). The network 159 can be any generally known network such as the Internet, an intra net, the phone network, or a telecommunications network.

Block 120 is a dispatch server which runs the computer network dispatcher process 600 (600A, 600B). This process 600 is described in detail in FIG. 6 below. The dispatch server 120, optionally, runs a scheduler process 128 and a billing process 129. The dispatch server 120 has one or more memories 126 which contain a transmission decision list 200, a file list 300, a file transmission history log 400, and an optional network use criteria table 500. These lists (200, 300, 400, 500) are described in detail in FIGS. 2, 3, 4, and 5, below, respectively. System time 125 is a clock which provides timing information to the dispatch server 120.

Blocks 124A and 124B are network buffers which buffer information to be written from the dispatch server 120 to its network connections, 122A, 122B. Each network buffer 124A, 124B has an available space measure, typically 123, which is an indication of how much information the buffer (124A, 124B) can hold before overflowing. The measure of available space 123 in the network buffers 124A, 124B will change over time as information is written into the network buffers 124A, 124B by the dispatching process 600 and other processes which may be sharing the network buffers 124A, 124B. The available space measure 123 will also change as information within the network buffers 124A, 124B is transmitted to connected computer networks 150, 159. Many factors limit the amount of information which can be transmitted at any point in time. These factors can include the network speed, the bandwidth of the network, congestion of the network, and availability of the network. Certain network resources, such as satellite 150 time, may be available on a scheduled basis, and their network parameters (e.g. cost, pricing, speed, bandwidth) may vary depending on a time of day.

Block 110 is a mass storage device. In a preferred embodiment, this mass storage device 110 is a disk drive. In alternative embodiments, the storage device 110 could be one or more disk drives, magnetic tape drives, memories, or optical drives (e.g. CD-ROM, DVD). The mass storage device 110 contains a file system 112 containing zero or more files 112A and a database 113 which contains zero or more delivery criteria lists 114. The file system 112 and database 113 hold the information which the computer network dispatching process 600 writes onto the computer networks 150, 159 through the network buffers (124A, 124B). The mass storage device 110 is connected 116 to the dispatch server 120. In a preferred embodiment, this connection 116 is made via a Small Computer System Interface (SCSI) connection. In alternative embodiments, the connection 116 could be a network connection or any other connection used for transmitting data. The connection 116 serves as an input to the dispatch server 120 for accessing the files 112A and databases 113 of the mass storage device 110. Connections 116 may also exist between the mass storage device 110 and the optional schedule server 130 and request server 140.

Block 130 is an optional scheduling server. This server 130 runs a scheduler process 134, an acceptance process 139, a delivery status process 137, and, optionally, a billing process 136 and analysis process 138. The scheduler process 134 (and the optional scheduler process 128 of the dispatch server 120) schedules one or more portions of the files 112A in the mass storage 110 file system 112 for transmission by the dispatch server 120 via its network buffers 124A, 124B. The scheduler process 134 (128) does this by writing a transmission decision list 200 and a file list 300 in the memory 126 of the dispatch server 120. The file list 300 associates files 112A in the file system 112 with the network buffer 124A. The transmission decision list 200 provides transmission criteria 250 (e.g. pacing, timing, and portioning information) about the transmission of the files 112A.

The optional billing processes (129, 136) of the dispatch server 120 and the scheduling server 130 monitor the progress of the dispatching process 600 (600A, 600B) and examine statistics stored in the dispatching process 600 history log 400 and network use criteria table 500 in order to determine a cost of a file transmission. Optionally, an analysis process 138 also examines these statistics (400, 500) to test for conformance of the dispatching processes 600 to the schedule defined by the scheduler process 134 and for overall system monitoring and activity charting. In a preferred embodiment, the outputs of the billing process 136 and analysis process 138 are stored in a database 113.

The scheduling server 130 contains a memory 131 which contains zero or more transmission requests 700. The transmission requests 700 contain scheduling constraints and information regarding the transmission of information files 112A. Transmission requests 700 are discussed in FIG. 7, below.

The acceptance process 139 is a process which determines if it is possible to schedule a transmission of a file 112A in accordance with the information in a transmission request 700, taking into consideration network use availability, as recorded in the network use criteria table 500, and other pending transmission requests 700. The acceptance process 139 is described in FIG. 14, below.

The delivery status process 137 is a process which takes an action (such as notifying a system operator, or a client 160, 170, 180) when the system 100 determines that it cannot meet the scheduling constraints of an accepted transmission. The delivery status process 137 is described in FIG. 8, below.

Block 140 is a request server which contains a request receiver process 144 and a content generator process 146. The request receiver process 144 and content generator process 146 are interfaces by which a request client 180 can request the insertion of files 112A into the file system 112, request the transmission of files 112A, view the history logs 400 and network use statistics 500 generated by the dispatch server 120, and view the outputs of the billing process 136 and analysis process 138. In a preferred embodiment, the request receiver process 144 and content generator process 146 are web servers and receive/transmit information from/to a request client 180 via the well known Hypertext Transfer Protocol (HTTP) protocol. In an alternate embodiment, the request receiver process 144 interacts with a request client 180 via the Simple Network Management Protocol (SNMP) protocol and the content generator process 146 interacts with a request client 180 via the File Transfer Protocol (FTP) protocol. The request receiver process 144 and content generator process 146 may alternatively interact with a request client 180 via a non-real time protocol such as e-mail or message queues. Block 142 of the request server 140 is a network connection. The network connection 142 provides a connection to a network 159 which is also accessible in real time or non-real time to the client 180 and, optionally, clients 160, 170.

The request server 140 also contains a transmit time process 147 which determines the time requested to transmit a file 112A based on its size, the network speed, the time of day, the size of the network buffers (124A, 124B), and information in the transmission request 700 associated with the file 112A. This process 147 is described in the network use allocation process 1200, FIG. 12 below, specifically in step 1235.

Note that servers 120, 130, and 140 can be combined or distributed over one or more computers. Scheduling processes 128 and 134 may also be combined or distributed over one or more computers. Billing processes (129, 136), analysis processes 138, acceptance processes 139, delivery status process 137, request receiver processes 144, transmit time processes 147, and/or content generator processes 146 may also be combined or distributed.

Blocks 150 and 159 are two types of computer networks. Block 159 is an internet/intranet network. Internet/intranet networks 159 are well known and consists of one or more interconnected switches 153, bridges 154, routers 155, and proxies 156. The intranet/internet network 159 passes digital messages and transmissions between servers (e.g. 120, 140) and connected clients (e.g. 170, 180). Each connected server (120, 140) and client (170, 180) has a network connection (122B, 142, 172, 182, respectively) to the network 159. Line 157 represents the network links between the network connection (122B, 142, 172, 182) and the internet/intranet network 159. These network links 159 are typically telephone lines, cable networks, or wireless networks.

Blocks 150, 151, 152 and 158 form a broadband satellite network. Digital data is carried over a network link 158 to a satellite transmitter 151 where it is modulated into radio-frequencies (RF) and broadcast into the sky to be reflected/rebroadcast by an orbiting satellite 150. The reflected/rebroadcast RF encoded data is received at satellite receivers 152, demodulated into digital data, and transmitted over a network link 158 to a satellite client 160. Blocks 122A and 162 are network connections which connect their respective hosts (dispatch server 120 and satellite client 160) with the network links 158 of the broadcast satellite network 150. As a non-limiting example of a network connection 162, see U.S. Pat. No. 6,021,419 to Clarke et al. issued on Feb. 1, 2000. This patent is herein incorporated by reference in its entirety.

Blocks 160 and 170 are satellite clients and internet clients, respectively. These clients (160, 170) receive information transmitted through the network buffers 124A, 124B of the dispatch server 120 and onto the respective connected computer networks (150, 159) by the dispatching process 600. Each client (160, 170) has a network buffer (164, 174) which buffers information received from the connected computer network (150, 159) and a receiving process (166, 175) which performs an action on the received information.

The satellite client 160 is connected to the satellite network 150 via network connection 162. It receives information transmitted by the dispatch server 120 through network buffer 124A. Through well know protocols, after the dispatching process 600 writes information into the network buffer 124A, that information will be digitally sent to satellite transmitter 151 and modulated into RF. The RF encoded information will be reflected/rebroadcast by satellite 150 and received by satellite receiver 152 to arrive in digital form at network connection 162. The information will then enter the network buffer 164 of the satellite client 160. The receiving process 166 will be alerted to the presence of the received information in the network buffer 164 and will take an appropriate action.

Similarly, internet/intranet client 170 is connected to internet/intranet 159 via network connection 172. It receives information transmitted by the dispatch server 120 through network buffer 124B. Through well known protocols, after the dispatching process 600 writes information into the network buffer 124B, that information will flow through the internet/intranet network 159 to arrive at network connection 172. The information will then enter the network buffer 174 of the internet/intranet client 170. The receiving process 175 will be alerted to the presence of the received information in the network buffer 174 and will take an appropriate action. The actions of the internet/intranet client 170 receiving process 175 and the satellite client 160 receiving process 166 could include: decoding the information into an audio wave form and playing it over a speaker 176; decoding the information into a video presentation and displaying it on a monitor 177; displaying the information as a web page on a monitor 177; and/or storing the information on a mass storage device 178.

Block 180 is a requesting client which has a network connection 182 to internet/intranet network 159. Client 180 has a request process 186 which communicates to the request receiver process 144 through network buffer 184 and connected network 159. This process 186 creates transmission requests 700 which are sent to the request receiver process 144 to schedule transmissions of a file 112A. The client 180 may contain an optional mass storage 188 which holds files 112A which are accessed by the content generator process 146 for storage and transfer to the file system 112 of mass storage 110.

Figure 2:
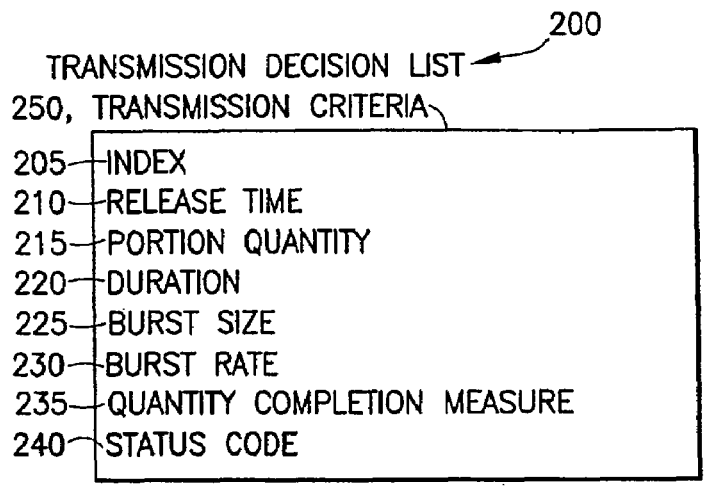
FIG. 2 is a block diagram of a transmission decision list which contains transmission criteria which is used by a dispatcher process to determine when to transmit data files.

FIG. 2 is a block diagram of the transmission decision list 200 data structure. The transmission decision list 200 is a sequence of zero or more transmission criteria 250 that instruct the dispatching process 600 (600A, 600B) about how, when, and at what burst rate, a file 112A should be transmitted over a network (150, 159). The transmission criteria 250 data structure contains the following fields: an index 205, a release time 210, a portion quantity 215, a duration 220, a burst size 225, a burst rate 230, a quantity completion measure 235, and a status code 240. The index field 205 contains a reference into the file list 300 described in FIG. 3 below. Each value in a transmission criteria 250 index field 205 should refer to exactly one file list record 350. In a preferred embodiment, the index field 205 contains a numeric integer value. In alternate embodiments, the index field 205 can contain a numeric identifier, an alphanumeric identifier such as a filename, or a memory address. Note that multiple transmission criteria 250 may have index fields 205 which refer to the same file list record 350.

The portion quantity 215 field defines the quantity of the portion of the indexed 205 file 112A, that the dispatching process 600 should transmit. In a preferred embodiment, the portion quantity 215 field holds a byte count (e.g. 64000 bytes). In alternative embodiments, the portion quantity 215 field could hold a percentage (e.g. 10%). The release time 210 field indicates the minimum time at which the respective portion of the indexed 205 file 112A should be written to the network buffer (124A, 124B) by the dispatching process 600. The duration 220 field establishes an end time beyond which no more of the portion is written to the network buffer (124A, 124B) by the dispatching process 600. In a preferred embodiment, both the release time 210 field and the duration 220 fields hold time stamp values. In an alternate embodiment, the duration 220 field could hold a number which indicated an offset (perhaps in seconds) against the release time 210. Hence, these three fields 210, 215, 220 of the transmission criteria 250 data structure define the size of a portion and an interval during which the dispatching process 600 should transmit the respective portion.

Note that in a preferred embodiment, the portion quantity 215 is included in the transmission criteria 250 but a value indicating where portion begins in the file 112A is not specified. As described below, the dispatching process 600 reads each portion from the files 112A starting with the value located in the cursor 315 field of the file list 300. As information within the portion is transmitted, the cursor 315 field is increased accordingly. The dispatching process 600 does this so that as portions of a file 112A are transmitted over a network buffer, e.g. 124A, the information transmitted will be contiguous within the file 112A. That is, there will be no gaps from one portion to another if, due to excessive load on a network, e.g. 150, the dispatching process 600 is unable to write an entire portion quantity 215 amount of information into the network buffer during the time interval specified by the release time 210 and duration 220.

The burst size 225 and burst rate 230 fields of the transmission criteria 250 data structure are used to specify limits on the amount of a portion written into a network buffer (124A, 124B) at any specific time. Together, the burst size 225 and burst rate 230 fields provide pacing information to the dispatching process 600. The dispatching process 600 will partition the respective portion of the file 112A into quantities of a size no greater than the burst size 225 and each quantity will be written to its respective network buffer (124A, 124B) at a time interval not less than the burst rate 230. This pacing information can be used to lessen the chance of information loss through the network (150, 159) when, for example, the network buffer (124A, 1224B) of the dispatching server 120 is of a different size than the network buffer (164, 174) of a connected client (160, 170). Or when the receiving process (166, 175) and/or the network buffers (164, 174) of a client cannot receive an entire portion quantity 215 of information in one transmission. The burst size 225 and burst rate 230 fields are optional.

The index 205, release time 210, portion quantity 215, duration 220, burst size 225, and burst rate 230 fields of the transmission criteria 250 data structure provide input data to the dispatching process 600.

The quantity completion measure 235 and status code 240 fields of the transmission criteria 250 data structure are filled in, over time, with an output of the dispatching process 600. As the dispatching process 600 writes portions, or quantities of partitioned portions, into a network buffer (124A, 124B) for transmission, the dispatching process 600 a quantity completion measure 235 will be accumulated. In a preferred embodiment, the quantity completion measure 235 field holds a byte count of information within the partition transmitted. When the value in the quantity completion measure 235 field is equal to the value in the portion quantity 215 field, the portion has been completely written into the network buffer (124A, 124B). The quantity completion measure 235 and status code 240 fields are optional.

The status code 240 field of the transmission criteria 250 data structure can take on one of the following values: "Pending", "Active", "Complete", and "Timed out". This field 240 indicates state of the partition the transmission criteria 250 data structure. If the status code 240 field has a "Pending" or "Active" value, the partition specified by the transmission criteria 250 is available to be written into the network buffer 124A, 124B by the dispatching process 600 (within the time interval specified by the release time 210 and duration 220 fields). A "Complete" value in the status code indicates that the dispatching process 600 has completed the writing of the partition into the network buffer 124A, 124B. And a "Timed out" status code 250 value indicates that the dispatching process 600 was unable to write the entire portion quantity to the network buffer 124A, 124B before the duration 220 elapsed. The status code 240 field has an initial value of "Pending". In alternative embodiments, the status code 240 field may also take on additional, and more specific, values such as codes indicating mass storage media errors (i.e. parity errors, disk errors), network errors, destination not found errors, and destination not responding errors.

Figure 3:
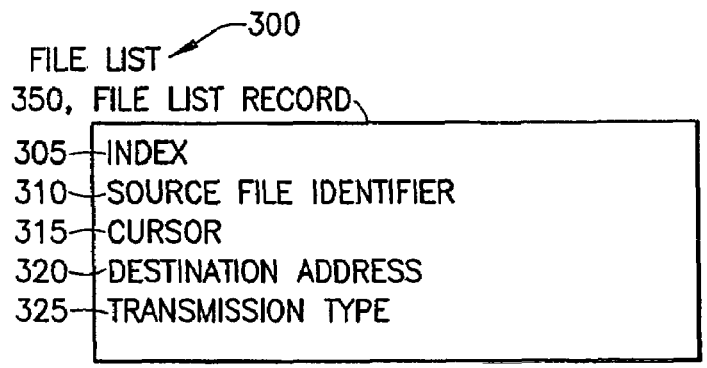
FIG. 3 is a block diagram of a file list which identifies the data files and is used by a dispatcher process.

FIG. 3 is a block diagram of the file list 300 data structure. The file list 300 is a sequence of zero or more file list records 350 that correlate one or more transmission criteria 250 with individual files 112A within the file system 112 of the mass storage 110. The file list record 350 data structure contains the following fields: an index 305, a source file identifier 310, an (optional) cursor 315, a destination address 320, and a transmission type 325. The file list records 350 identify files 112A in the mass storage 110 that are to be transmitted over one or more of the computer networks (150, 159) connected to a respective network buffer (124A, 124B). The file list records 350 also serve to associate the files 112A with the portioning information defined in the transmission criteria 250.

The index 305 field holds a value which uniquely distinguishes a file list record 350 from other file list records 350 in a file list 300. In a preferred embodiment, the index 305 field holds an integer value. In alternate embodiments, the index 305 field can hold some other type of unique value such as a file name or other mass storage identifier and may also share the same value as the source file identifier 310 field. Or, the index 305 field may be the address in the memory 126 of the dispatching server 120 where the file list record 350 is located. The index 305 field is used as a cross reference to the index 205 field in transmission criteria 250 as described above.

The source file identifier 310 field associates the file list record 350 with a file 112A in mass storage 110. In a preferred embodiment, the source file identifier 310 field contains a handle value through which the dispatching process 600 can read information from a file 112A in mass storage 110. In alternative embodiments, the source file identifier 310 field could contain a file name (e.g. "C:\Data\Video.MPG"), a TCP/IP socket identifier, or a memory address of a computer process which delivered file information as its output.

Hence, through the index 305 field and the source file identifier 310 field, the file list record 350 provides an association between transmission criteria 250 and files 112A.

The optional cursor 315 field of the file list record 350 is used when the information of a file 112A is available in a random access mode. The values of the cursor 315 field indicate where information should be read from, by the dispatching process 600, in the identified 310 file 112A. As information is read and transmitted to network buffers (124A, 124B), by the dispatching process 600, the dispatching process 600 (600A; 600B) will update the value in the cursor 315 field. In a preferred embodiment, the cursor 315 field contains integer values with zero being a "beginning of file" value. In alternate embodiments, the cursor 315 field may contain memory addresses or other values appropriate to the type of mass storage 110 in use. When the file 112A can only be read in a serial manner (i.e. is not read in a random access manner), the cursor 315 field is omitted from the file list record 350 data structure.

The destination address 320 field of the file list record 350 identifies one or more network buffers (124A, 124B) that the dispatching process 600 should write the associated portioned 250 file 112A information into. The destination address 320 field may further identify one or more network connected client (160, 170) machines which will receive the portioned 250 file 112A information. In a preferred embodiment, the destination address 320 field holds an internet multicast address.

The transmission type 325 field identifies the protocol to be used by the dispatching process to transmit the portioned 250 file 112A information. Transmission types can include the well known unicast, multicast, broadcast, internet protocol (IP), IPX, asynchronous transfer mode (ATM), UDP, and TCP/IP protocols.

Figure 4:
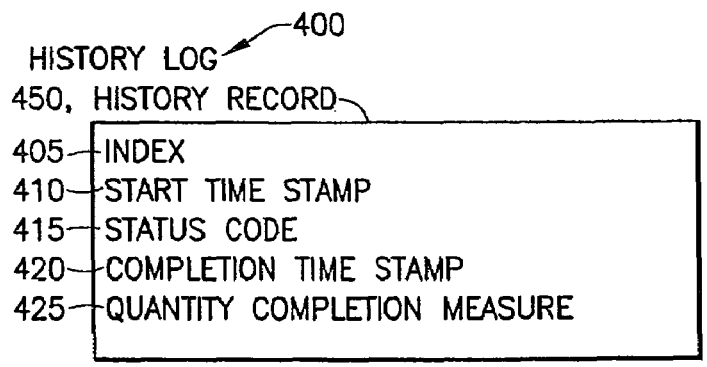
FIG. 4 is a block diagram of the history log generated during the execution of a dispatcher process.

FIG. 4 is a block diagram of the history log 400 data structure. The history log 400 is a sequence of zero or more history records 450 which provide an accumulated amount of one or more of the portions 250 of files 112A transmitted over one or more of the computer networks 150, 159 by the dispatching process 600 in an interval. The history log record 450 data structure contains the following fields: an index 405, a start time stamp 410, a status code 415, a completion time stamp 420, and a quantity completion measure 425. The history log 400 is an output of the dispatching process 600.

The index 405 field of the history record 405 holds a value equal to a value of an index 305 field in a file list record. The start time stamp 410 and completion time stamp 420 fields define a time interval. And, the status code 415 field and quantity completion measure 425 fields are progress indicators which hold a success value and an accumulated amount of portions transmitted by the dispatching process 600 during the specified interval (410, 420). In a preferred embodiment, the status code 415 field can hold the same values as the status code 240 field in the transmission criteria 250 data structure. Similarly, the quantity completion measure 425 field is of the same data type as the quantity completion measure 235 field of the transmission criteria 250 data structure. In alternative embodiments, the progress indicators (415, 425) may hold multiple values, e.g. multiple status codes.

During its execution, the dispatching process 600 progressively populates the history log 400 with history records 450. Study of the growing history log 400 of history records 450 can provide analysis processes 138 and/or billing processes (129, 136) with statistics about the progress of file 112A portion 250 transmissions and the computer networks (150, 159). Parts of the cumulative history log 400 may also be offloaded from the memory 126 of the dispatching server 120 and stored in mass storage 110 for off-line analysis. In a preferred embodiment, the dispatching process 600 populates the history log 400 with a history record 450 each time an amount of portioned 250 information is written into a network buffer (124A, 124B). In alternative embodiments, the dispatching process 600 may populate the history log 400 less frequently, perhaps on a timed basis (e.g. create cumulative history records 450 each minute or hour of activity).

Figure 5:
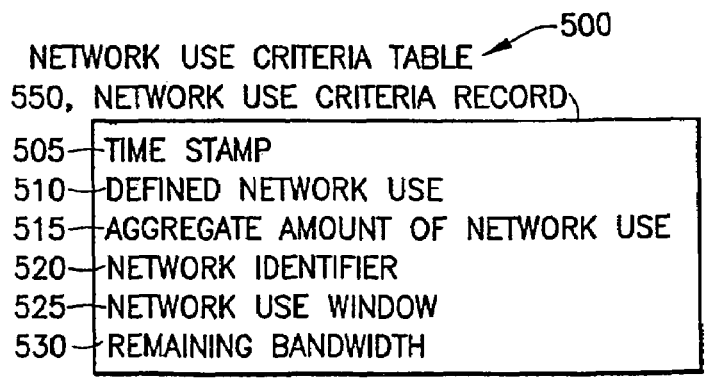
FIG. 5 is a block diagram of the network use criteria table which is used by a dispatcher process.

FIG. 5 is a block diagram of an optional network use criteria table 500. The network use criteria table 500 is a sequence of zero or more network use criteria records 550 which specify a maximum value of network resource that is to be used by the dispatching process 600 (600A, 600B) in a given interval of time. The network use criteria record 550 data structure contains the following: a time stamp 505 field, a defined network use 510 field, an aggregate amount of network use 515 field and an optional network identifier 520 field. The network use criteria record 550 data structure may also contain a network use window 525 field and a remaining bandwidth 530 field.

The defined network use 510 field is used to constrain the dispatching process 600 to use a limited amount of network resource (e.g. bandwidth) starting at a time specified in the time stamp 505. In a preferred embodiment the defined network use 510 field defines a maximum amount of the information stored in the files 112A which should be written to a network buffer (124A, 124B) after a specific time 505. As information is written into the network buffers (124A, 124B) by the dispatching process 600, the dispatching process 600 will maintain a count of the network resources (e.g. bandwidth) used in the aggregate amount of network use 515 field.

The network use criteria table 500 is most useful when resources of a computer network (e.g. 150) resources, such as satellite 150 time, are be available on a scheduled basis, and network parameters (cost, speed, bandwidth) vary depending on time of day. For example, a satellite uplink facility may lease satellite network 150 bandwidth at 45 Mbps between 4:00 AM and 5:00 AM and 15 Mbps at all other times of the day. To accommodate these constraints in the system 100, a network use criteria table 500 containing twenty-four network use criteria records 550 could be constructed on a daily basis. The twenty-four network use criteria records 550 could contain successive time stamp 505 values ranging from 0:00 (midnight) to 23:00 (11:00 PM). The network use criteria record 550 which had a time stamp 505 value of 04:00 AM could have defined network use 510 value of 45 Mbps×60×60 (i.e. the amount of bandwidth available in that one hour). The other network use criteria records 550 could have a defined network use 510 value of 15 Mbps×60×60.

The aggregate amount of network use 515 values written by the dispatching process 600 may be recorded as a supplement to the history log 400 and stored in mass storage 110 for analysis purposes.

The optional network use window 525 field is used to indicate the length of the interval of time the network use is defined 510 for. In a preferred embodiment, this field 525 does not exist in the network use criteria record 550 data structure, but a value for this field 525 is computed on demand. The network use window 525 is a virtual field. The virtual network use window field 525 value being the time interval between the time stamp 505 of the network use criteria record 550 and the time stamp 505 of the network use criteria record 550 with the next greater time stamp 505. In alternate embodiments, the network use window 525 field may exist in the network use criteria record 550, e.g. occupy memory. In other alternate embodiments, an end time stamp 505 may be used in place of an interval window 525.

The optional remaining bandwidth 530 field is used to indicate an amount of available bandwidth which is available during the time period specified by the network use criteria record 550. In a preferred embodiment, the remaining bandwidth field 530 is a virtual field and its value is computed on demand. The virtual remaining bandwidth field 530 has a value equal to the difference between the defined network use 510 and the aggregate amount of network use 515 divided by the network use window 525.

The network use window 525 and remaining bandwidth 530 fields are used in the network use allocation process 1200, FIG. 12 below, in order for the network use allocation process 1200 to tentatively reserve portions of network use.

The optional network identifier 520 field is used to identify which computer network 150, 159 the network use criteria record provides constraints against when the dispatching server 120 is connected to two or more computer networks, each with possibly differing constraints.

The dispatching process 600 (600A, 600B) uses the data structures described above (200, 300, 400, 500) to transmit portions of one or more files 112A over the network (150, 159) on a scheduled basis. And, to provide feedback to processes (e.g. Scheduler process 128, 134, billing process 136, analysis process 138) indicating the progress of each file 112A portion transmission over time.

Figure 6:
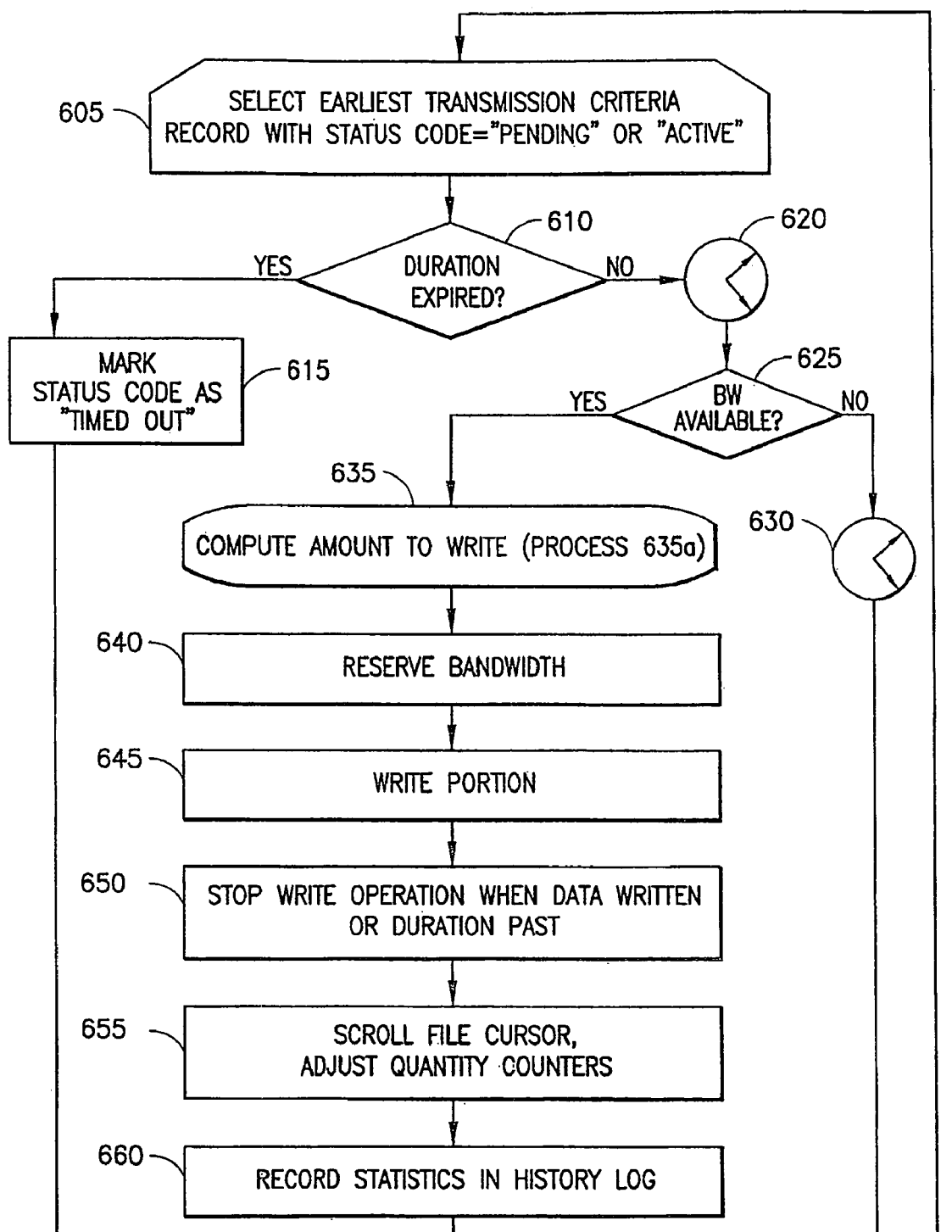
FIG. 6 is a flow chart of a dispatcher process.
Figures 2, 6:
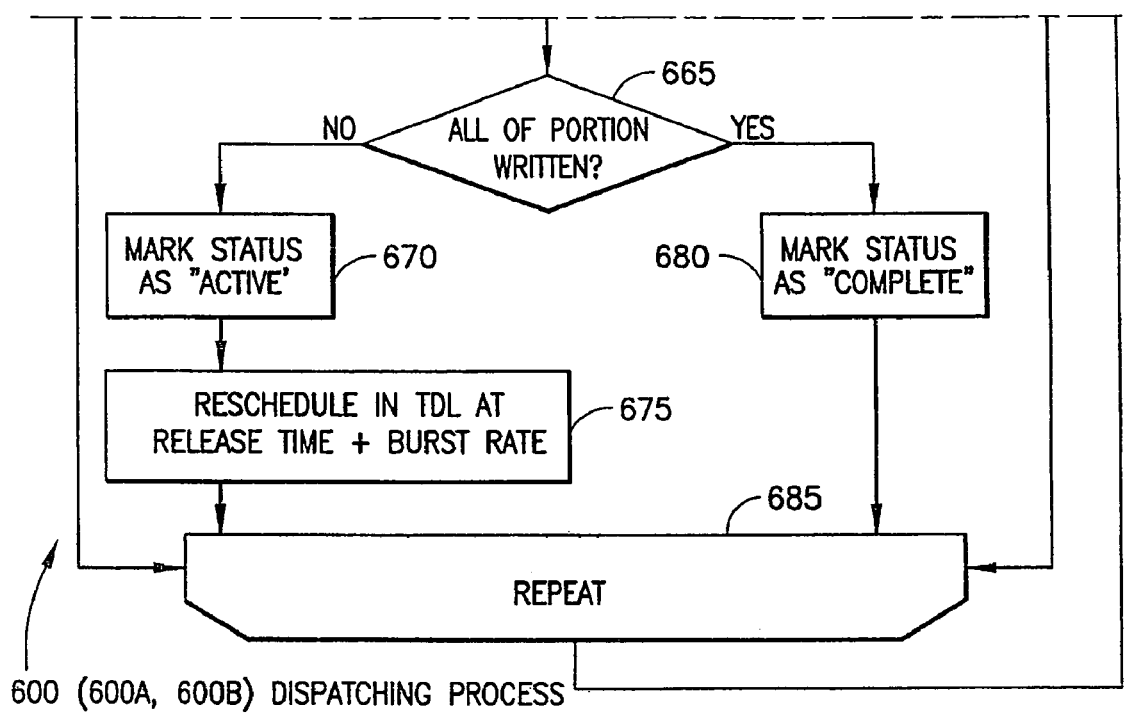

FIG. 6 is a flowchart of a dispatching process 600 (600A, 600B) called the Dispatch State Machine with Feedback for Scheduled Transmissions. This process 600 transmits files 112A over a computer network (150, 159) based upon transmission criteria 250 contained in a transmission decision list 200. The process begins 605 by selecting the transmission criteria 250 entry on the transmission decision list 200 with the earliest release time 210 and a status code 240 which is either "Pending" or "Active". The dispatching process 600 then examines 610 the (optional) duration field 220 of the selected transmission criteria 250. The value in the duration field 220 is compared against the current time of the system clock 125. If the duration 220 has passed, step 615 stores a "Timed Out" value in the status code 240 field of transmission criteria 250 and execution of the process 600 continues to step 675 where a next iteration 605 of the dispatching process 600 (600A, 600B) is begun.

If the duration 220 has not passed, the dispatching process 600 continues to step 620 where the process 600 pauses in an idle state until the release time 210 of the transmission criteria 250 has passed. In a preferred embodiment of the process 600, this pause 620 may be interrupted when a new entry 200 is inserted into the transmission decision list 200 which has a release time 210 earlier than the currently selected transmission criteria 250 or when an existing entry of the transmission decision list 200 is modified so that its release time 210 is earlier than that of the currently selected transmission criteria 250. When the process 600 is interrupted in this manner, execution returns to step 605. This idle step 620 allows the dispatching process 600 to (a) support schedules which are non-work conserving, (b) ensure that transmissions will not be initiated prematurely before their specified release times 210, and (c) allow the throttling of transmissions to an arbitrarily specified burst rate 225 and burst size 230.

For example, a transmission decision list 200 may contain a transmission criteria entry 250 with a release time 210 of 05:00 hours. If, during the execution of process 600, this entry 250 is selected at 04:45 hours, the process 600 will idle at step 620 for fifteen minutes. During this idle period the process 600 will write no data to the network even though there are entries in the transmission decision list 200 and thus will be non-work conserving (a). Execution of the process 600 will not resume until 05:00 hours and therefore the portion defined by the transmission criteria 250 with a release time of 05:00 hours will not be transmitted prematurely (b).

Similarly, suppose that a transmission criteria 250 contains a burst size field 225 of 10 Kbytes and a burst rate field 230 of 00:01 hours (one minute). After a first amount of data is written by process 600, the transmission criteria 250 will be rescheduled, step 670, with a release time 210 one minute greater than the first release time. This will cause step 620 to idle until one minute has elapsed and limit the burst rate of the transmission (c).

When the release time 210 of the selected transmission criteria 250 has arrived (or has past), the dispatching process 600 checks for availability of bandwidth, step 625. A network use criteria record 550 is chosen from the network use criteria table 500, and the defined network usage 510 is compared against the aggregate amount of network usage 515 to determine a network resource availability. In a preferred embodiment, the defined network usage 510 field and the aggregate amount of network usage 515 fields hold integer amounts of bandwidth. Equal values of the two fields (510, 515) indicate that there is no available bandwidth, and upon finding equal values, the process moves into a second idle state 630. The process 600 will idle 630 until the time specified in the time stamp 505 field of the next entry of the network use criteria table 500. After the idle time of step 630 has elapsed, execution resumes to step 685 and then step 605 where a second iteration of the dispatching process 600 is begun.

The network use criteria record 550 is chosen from the network use criteria table 500 by selecting the record in the network use criteria table 500 which has the greatest time stamp field 505 that is less than or equal to the time of the system clock 125. By using the system clock 125 as an index into the network use criteria table 500, the dispatching process 600 can operate on and take advantage of computer networks, e.g. 150, where the network resources available varies over time.

Refer now to FIG. 6A which is a flow chart of an amount-to-write computation process 635A.

The dispatching process 600 continues 635 by computing an amount of data 635 to write. This amount 635 will be used by the process 600 during the reservation and write steps (640, 645 respectively) described below when the process 600 writes information into a network buffer 124A, 124B. In a preferred embodiment, the amount 635 is the minimum (e.g. byte length) 636 of the following values: (a) the quantity of network resources currently available 510 less the aggregate amount of network use 515 in the network use criteria table 500; (b) the portion quantity 215 value stored in the currently selected transmission decision list entry 200; (c) the burst size 225 value also from the currently selected transmission decision list entry 200. Each of these fields (515, 215, 225) can have optional "not-specified" values which indicate that no number is given in the respective field. Fields which contain the not-specified value are ignored for purposes of calculating the amount of data 635 to write. In alternate embodiments, these fields (515, 215, 225) are optional and may be ignored during the calculation 635. An embodiment may also include (d) the available space 123 in a network buffer (124A, 124B) as a further factor in the minimum calculation.

The portion quantity 215 value of the transmission criteria 250 is chosen as a candidate for the amount of data to write 635 because it indicates the maximum total amount of data which should be transmitted for the transmission decision list entry 200. This value may be smaller than the burst size 225 and the network resources available 510, 515. If the process 600 were to write more than quantity to write 215 bytes, the process could read past a buffer, encounter an end-of-file error, or write more data than the transmission criteria 250 called for.

The burst size 225 value of the transmission criteria 250 is chosen as a candidate for the amount of data to write 635 because it indicates the amount of data which should be transmitted for the transmission criteria 250 during a burst rate 230 interval. The process 600 will not write more than burst size 225 bytes for any transmission during a burst rate 230 interval. The process 600 paces itself in this manner so as not to overwhelm the networks 150, 159 with data and so that network buffers in the server computer (124A, 124B), network devices at intermediate points (e.g. proxies 156, routers 155, switches 153, bridges 154), and receiving buffers (164, 174) and receiving processes (166, 175) in client computers (160, 170) will be able to handle the network load.

Now refer back to FIG. 6.

After computing the amount to write 635 value, the dispatching process 600 then 640 reserves bandwidth from the network use criteria table 500. In a preferred embodiment this reservation is done by increasing the aggregate amount of network use 515 field of the network use criteria record 550 selected in step 625 by the amount to write value 635. In alternate embodiments the reservation may be performed using a second table or other data structure. This reservation prevents two or more instances of this process 600 which may be running concurrently from writing more data to a network (150, 159) than it can handle.

The dispatching process 600 then proceeds 645 to write data into a network buffer (124A, 124B). The process 600 does this by locating the file list record 350 in the file list table which has a file list index 305 that is equal to the index 205 in the selected transmission criteria 250. Data is then read from the file 112A referenced by the source file identifier 310 starting at the location specified by the cursor 315. The read data is written to the network buffer (124A, 124B) identified by the destination address 320, optionally, accompanied with the destination reference 320. One amount to write value computed in step 635 is used to place a limit on how much data is written at this step 645. In a preferred embodiment, the data is written in a non-blocking manner so that execution of the dispatching process 600 will not be delayed by a block waiting for a network buffer 124A, 124B to clear. The dispatching process 600 also maintains a timer and monitors the elapsed time of the write operation 645. If the time of the system clock 125 passes the duration 220 specified in the transmission criteria 250 or the elapsed time exceeds the burst rate 230, the process cleanly preempts (rather than aborting) its write operation 650. In alternate embodiments, the process 600 may also conditionally interrupt the write operation 650 when the transmission criteria 250 is modified by a second process (i.e. a scheduler).

When its write operation 645 completes (normally or preemptively), the dispatching process 600 updates fields 655 within the transmission criteria 250, the file list record 300, and the network use criteria record 550 to reflect the transmission (writing of data step 645). Within the selected transmission criteria 250, the portion quantity field 215 is decremented by the amount of data written (which may be less than the value computed in step 625 if the write operation was interrupted), and the quantity written field 235 is incremented by the same amount. The cursor 315 field in the selected file list record 350 is incremented by the amount of data written. And within the selected network use criteria record 550, the aggregate amount of network use 515 is decremented by the difference between the amount of resources used and the amount of network resources estimated by the amount of data to write 625 (in order to give back any unused resources previously reserved in step 640).

The dispatching process 600 then 660 edits the history log 400 to record the transmission 645 event. Step 650 appends a new history record 450 is appended to the history log 400. The index field 205 value of the selected transmission criteria 250 is copied into the history record 450 index 405, the time reading from the system clock 125 in step 625 is copied into the start time stamp field 410, the time reading from the current system clock 125 is copied into the completion time stamp field 420, and the amount of data written in step 635 is recorded into the quantity completion field 425. Further, a status code (e.g. "Success", "Preempted due to duration", "Preempted due to transmission criteria modification", "Preempted due to network error", "Preempted due to disk error", "File not found", . . . ) is written into the status code field 415.

These two steps (655, 660) allow other processes (e.g. Schedulers 128, 134, billing 129, 136, analysis processes 138, and feedback processes 1300, described in FIG. 13 below) to monitor the progress of file transmissions. By updating the history log 400, the dispatching process 600 can provide feedback to a scheduler (128, 134) so that it can dynamically reschedule transmissions due to delays in the network or due to unexpected increases in network bandwidth. Analysis processes 138 may also use this information to check the network and state machine for conformance to and variances from a defined schedule. These other processes may also monitor changes made by the dispatching process 600 to the transmission criteria 250 and file list records 350.

The dispatching process 600 then, step 665, examines the portion quantity 215 field of the transmission criteria 250. If the portion quantity 215 field has a value of zero, step 680 marks the status code field 240 of the transmission criteria 250 as "Complete" and the dispatching process 600 will no longer select the transmission criteria 250 during step 605. Execution of the process 600 continues to step 685 and to step 605 where a next iteration of the process begins.

If the portion quantity 215 field of the transmission criteria 250 contains a non-zero value, step 670 marks the status code 240 field "Active" and transmission criteria 250 remains a candidate for selection in step 605. If an optional burst rate 230 was specified in the transmission decision list entry 200, the release time 210 field is incremented by the burst rate 230 in step 675. This will cause the dispatching process 600 to not transmit any more data for this transmission criteria 250 until the duration of time specified in the burst rate 230 has passed 620. Execution of the process 600 continues to step 685 which is simply a jump to the start of the process 600, step 605, where a next iteration of the process 600 will commence.

Figure 7:
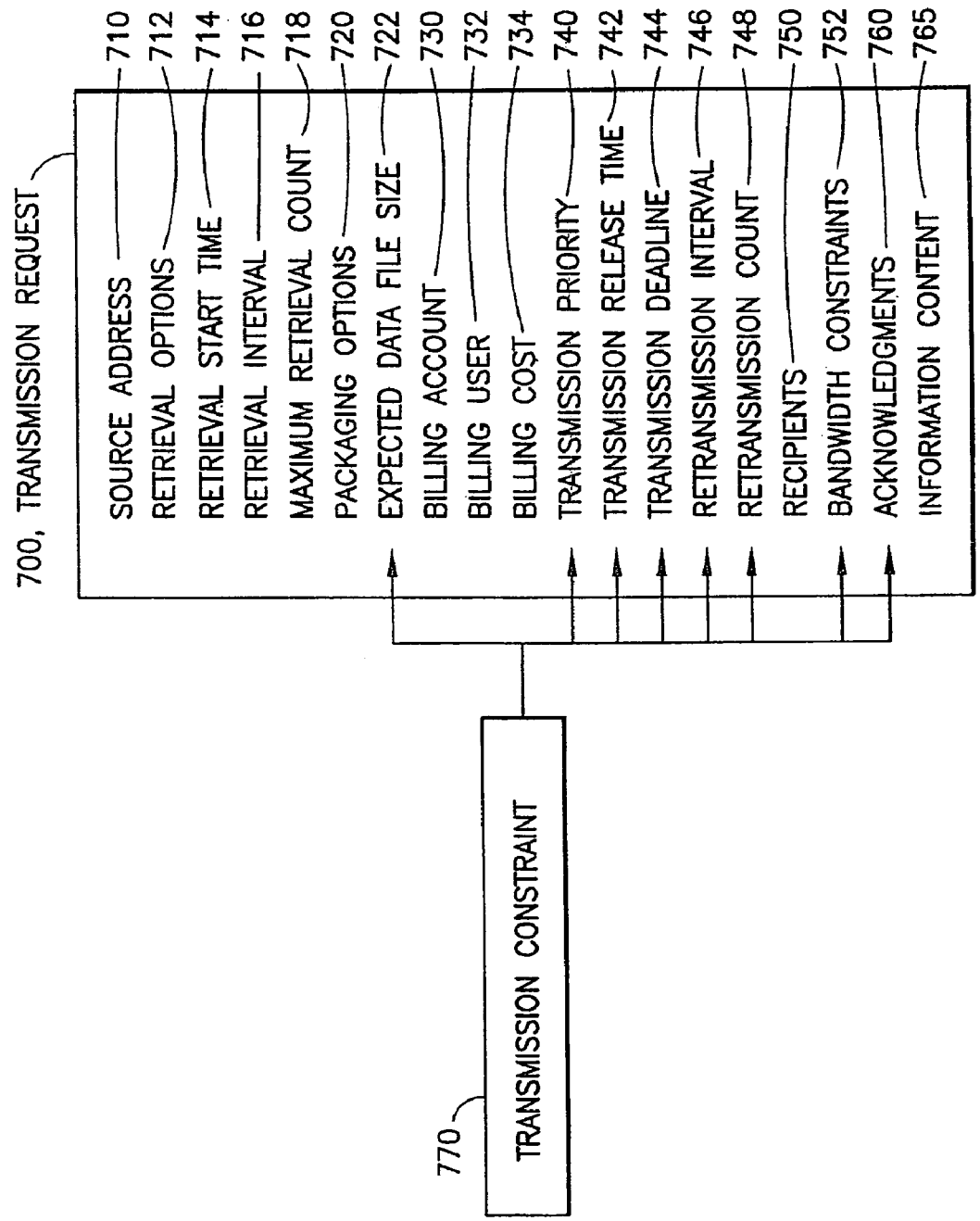
FIG. 7 is a block diagram of a transmission request data structure.

FIG. 7 is a block diagram of a transmission request 700. Transmission requests 700 are received from a client 180 by the request receiver process 144, described in FIG. 1 above. In a preferred embodiment, a message containing a transmission request 700 is sent from the client 180 to the request receiver process 144 via HTTP (the Hypertext Transport Protocol). The transmission request 700 data structure contains information which instructs the schedule architecture 800 to retrieve, transmit over a network (150, 159), and optionally confirm transmission of a data file 112A. The transmission request 700 contains fields that specify retrieval, packaging, billing, transmission, and/or acknowledgment requirements of the transmission. For example, these fields may specify: (a) how the data file 112A should be retrieved from a client 180 machine; (b) how the system 100 can bill the client 180 for work performed; (c) when the transmission should take place, and which destination clients (160, 170) should receive the transmission; and/or (d) what acknowledgments the client 180 wants regarding the success and/or failure of the transmission.

The fields (a) which specify how the data file 112A should be retrieved from a client 180 machine may include: a source address 710, a retrieval options field 712, a retrieval start time 714, a retrieval interval field 716, a maximum retrieval count field 718, a packaging options field 720, and/or an expected data file size 722 field.

The fields (b) which specify how the system 100 can bill the client 180 for the work performed may include: a billing account field 730, an optional billing user field 732, and/or an optional billing cost field 734.

The fields (c) which specify when the transmission should take place, and who should receive the transmission may include: a transmission priority field 740, a transmission release time field 742, a transmission deadline field 744, a retransmission interval field 746, a retransmission count field 748, a list of recipients 750, and/or a bandwidth constraints field 752.

The field (d) which specifies what acknowledgments the client 180 wants regarding the success and/or failure of the transmission is the acknowledgments field 760.

In a preferred embodiment of the system 100, the data file 112A which is to be transmitted over the network (150, 159) is not included in the transmission request 700. Instead, the transmission request 700 contains information which instructs the content generator process 146, described in FIG. 1, how and when to retrieve the data file 112A. The source address field 710 contains an address, e.g. a Uniform Resource Locator (URL), which indicates where the data file 112A can be retrieved from. An optional retrieval options field 712 contains additional information such as a userid and password which is used in conjunction with the source address 710 to retrieve the data file 112A over the network. A preferred embodiment of the system 100 includes scheduling information (714, 716, 718) which indicates when the data file 112A should be retrieved. The retrieval start time field 714 indicates a time when a retrieval of the data file 112A should be attempted. The retrieval interval field 716 indicates an interval, typically in seconds, after which a next retrieval should be attempted should a retrieval fail. The maximum retrieval count 718 field indicates the maximum number of retrieval attempts which should be made by the content generator process 146. An expected data file size 722 field is also included in the transmission request 700 and contains a well known quantization of the size of the file 112A to be transmitted. Typically, the field 722 contains a count of bytes.

There are many different ways to bring a data file 112A from a client 180 to the mass storage 110. Alternative embodiments of the system 100 may not include retrieval scheduling information (fields 714, 716, and 718) in the transmission request 700 and may perform one and only one retrieval attempt at the time the transmission request 700 is received. Other embodiments perform a fixed number of attempts. Further, the data file 112A may not be available over a connected network (150, 159) from the client 180 and need to be physically brought into the system 100. The data file 112A may arrive at a location accessible to the content generator process 146 on a CD-ROM, DVD disc, or VHS cassette tape. In these cases, alternative fields which include case-specific scheduling information (e.g. media type and a shippers tracking number) may be included in the transmission request 700.

After a data file 112A is stored in mass storage 110, optional packaging transformations may be performed on the data file 112A prior to its transmission. These transformations could include encryption, compression, or generation of forward error correction codes. The (optional) packaging options field 720 is used to indicate which, if any, transformations should be applied to the data file 112A.

In alternative embodiments, an additional field, the information content field 765, is included in the transmission request 700, in place of the fields pertaining to the retrieval of the data file 112A (710, 712, 714, 716, 718). In this embodiment, the expected data file size 722 field may be omitted and the size of the data stored in the information content field 765 used in its place.

The client 180 indicates how the transmission should be charged through the billing account 730 and billing user 732 fields of the transmission request 700. The billing account 730 field holds an account number/identifier such as a MasterCard or VISA credit card number or a previously negotiated identifier. The (optional) billing user 732 field contains a name or other identifier of the person placing the transmission request 700.

The (optional) billing cost 734 field specifies a maximum cost that can be charged to the billing account 730 for the requested transmission. In a preferred embodiment, the billing cost 734 field is omitted and the cost of a transmission depends on other fields in the transmission request (expected data file size 722, retransmission count 748, transmission release date 750, transmission deadline 744, and selected acknowledgments 1356). In alternative embodiments, the billing cost 734 field is used and can hold a dollar amount.

Several of the fields in the transmission request 700 hold details about when the transmission should take place, and who should receive the transmission. An optional transmission priority 740 field holds a keyword indicating a selected priority of the transmission. These keywords can include values such as "two day delivery", "acknowledged overnight delivery", and "freight". These values are used within the schedule architecture 800, particularly in the acceptance process 139, and the schedule process (128, 134) to indicate a desired quality and speed of service. A "two day delivery" key-word would indicate that a file 112A should be transmitted within 48 hours of receipt of the transmission request 700. A "acknowledged overnight delivery" keyword would indicate that a file 112A be transmitted before the next morning and that acknowledgments be returned by each recipient of the file 112A. A "freight" keyword would indicate that the file 112A be transmitted within a week of receipt of the transmission request 700.

In a preferred embodiment, the transmission priority 740 field is omitted from the transmission request 700. Instead of specifying a priority 740, the transmission request 700 contains additional fields. The optional transmission release time 742 is the time after which the customer wants the file transmitted. The transmission deadline 744 is the time before which the file 112A must to be transmitted. Note that these times can also be specified by a release time 744 and a transmission send window time, or a transmission deadline 744 and a transmission send window time.

The optional recipients 750 field designates the locations/people that are to be sent the file 112A. Recipient information 750 is typically used when retransmissions 748 and/or acknowledgments 760 are used. In a broadcast situation, the recipients 750 need not be specified because everyone on the network will be sent the file.

The optional acknowledgments field 760 is used to indicate when an acknowledgment is required from one or more of the recipients. One type of acknowledgment 760 indicates that a recipient received the file 112A, or parts of the file 112A. Another type of acknowledgment, a negative acknowledgment, indicates that the recipient did not receive the file 112A or did not receive parts of the file. For example, if a recipient expected a file 112A at 10:00 PM and did not receive it, it would send a negative acknowledgment. If a recipient received a portion of a file 112A and another portion of the file 112A was not received (e.g. due to being timed out 615, or due to network 150, 159 error), the recipient would send an acknowledgment indicating partial reception. In some embodiments of the system, this would cause a retransmission 748 to take place.

The optional bandwidth constraints field 752 defines the bandwidth requirements for a particular file 112A transmission. The bandwidth requirements can depend on the capabilities of the recipients, the quality of service that a subscriber paid for, and/or the physical requirements of the file 112A (e.g. constant bitrate video requires a minimum bandwidth for real-time playback).

The optional retransmission fields (746, 748) indicate that the client 180 requests retransmission of the file 112A if no acknowledgment or negative acknowledgment is received by any of the recipients. Retransmissions (746, 748) must conform to deadline 744 and bandwidth (625, 752) availability requirements. The optional retransmission interval field 746 indicates an interval, typically in seconds, after which a next transmission (i.e. a retransmission) should be attempted. The retransmission count 748 field indicates the maximum number of retransmissions which should be performed.

The collection of fields 740, 742, 744, 746, 748, 752, and 722 is known as a transmission constraint 770.

Figure 7A:
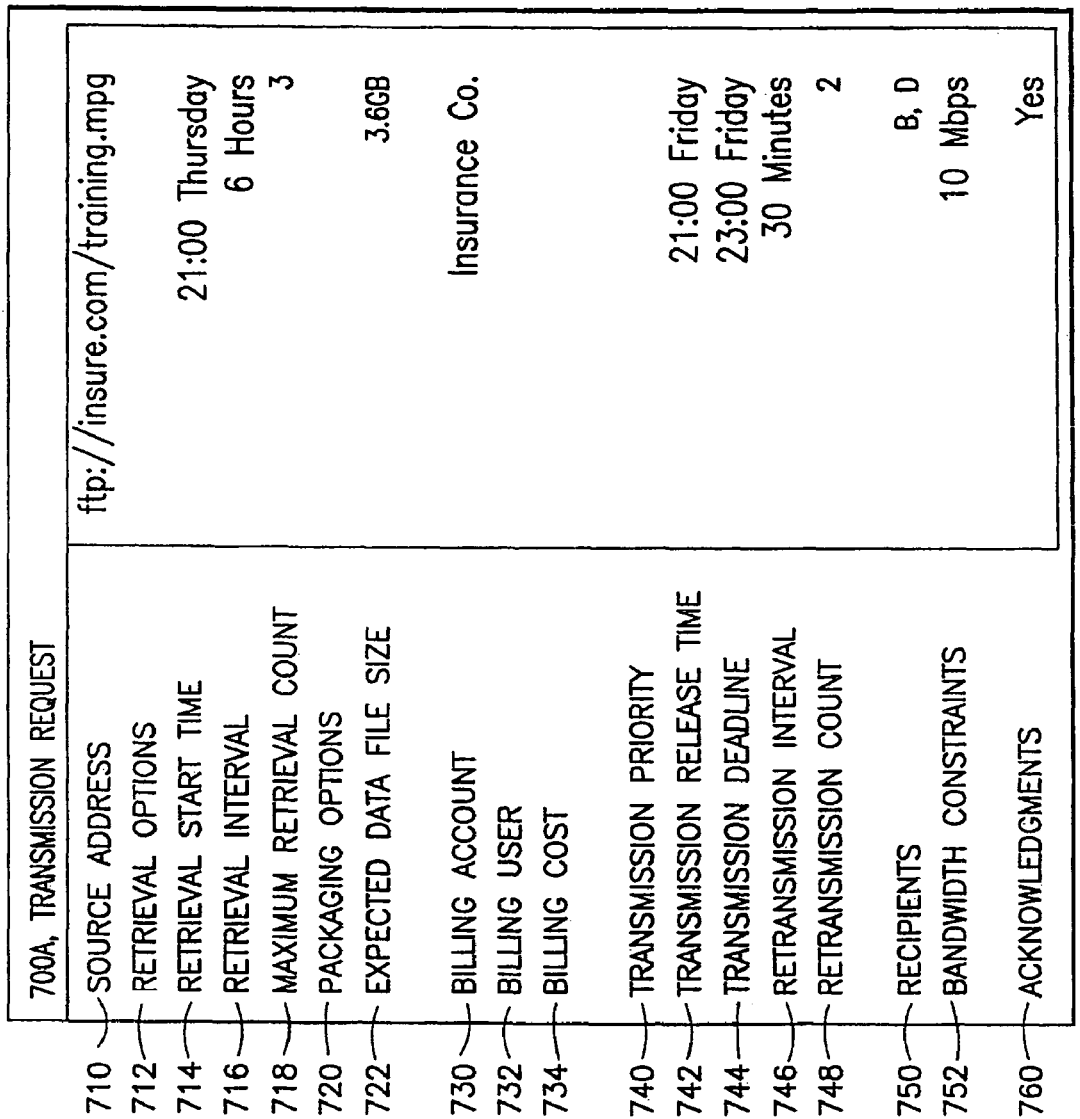
FIG. 7a is a block diagram of an example transmission request data structure.

FIG. 7A shows an example transmission request 700A. In this non limiting example, a subscriber such as a product or service provider, e.g. an insurance company providing digitized training videos, located at the source address 710, to its representatives (recipients 750), requests that the videos 710 be sent out over a weekend in order to be used in a course in the following week (transmission deadline 744). The company (billing account 730) requests a quality of service which provides ten megabits of bandwidth (bandwidth constraint 752), collection of acknowledgments 760 from the representatives, and a maximum of two retransmissions (retransmission count 748). The video is 3.6 Gigabytes long (expected data file size 722), approximately two hours of MPEG-2 compressed audio and video, and there are two groups of recipients: group B, the insurance agents, and group D, state regulators (see values in recipients field 750).

If this transmission request 700A is accepted into the system 100, the video file 112A will be retrieved from the source, e.g. FTP site, given in the source address 710. A maximum of three retrieval attempts (maximum retrieval count field 718) will be made. The first retrieval attempt will begin at or after 21:00 on Thursday (retrieval start time 714). Should the first retrieval attempt fail, a second retrieval will be attempted at or after 03:00 Friday, and possibly a third retrieval attempt at or after 09:00 Friday, per the six hour retrieval interval 716. The source address 710 is public and no userid and password is specified in the retrieval options field 712, which is empty. Once it is retrieved, the file 710 will be stored locally, in mass storage 110, as a data file 112A. The transmission request 700a indicates that no additional transformations (encryption, compression) should be performed after the data file 112A retrieved (see packaging options field 720).

In this transmission request 700A, the transmission priority field 740 is empty and therefore the other transmission related fields (742, 744, 746, 748) specify details about the scheduling of the file 112A network transmission and retransmissions. The transmission release time 742 indicates that the retrieved file 112A should be transmitted no earlier than 21:00 on Friday night and that all transmissions and retransmissions should conclude on or before 23:00 Friday (transmission deadline 744). The transmissions should be broadcast at approximately 10 megabits per second (bandwidth constraints 752). And two retransmissions 748 are requested after intervals of thirty minutes (retransmission interval 746). A transmission of a 3.6 GB file at 10 Mbps will take eight minutes to complete. In an alternative embodiment, the transmission priority field 740 can be specified as described above and there will be no need to fill in fields 742, 744, 746, 748.

Charges for the retrieval, transmission, retransmissions, and acknowledgments the system 100 performs for this request 700A will be billed to the Insurance Company (billing account 730). The transmission request 700A does not specify a billing user 732, and does not place any restrictions on the amount to be billed 734. Billing user field 732 could specify a specific individual at the insurance company that made the transmission request and/or be used to identify sub-accounts within the company, e.g. the education department. Billing cost field 734 is filled by the user to indicate the maximum amount the user is willing to pay for this transmission request 700. If the maximum amount exceeds the cost of the transmission request 700 and the transmission is successful, no action is taken. However, if no retransmission count is specified, retransmissions will continue if no acknowledgment is received until the amount specified in the billing cost 734 is exhausted.

Figure 8:
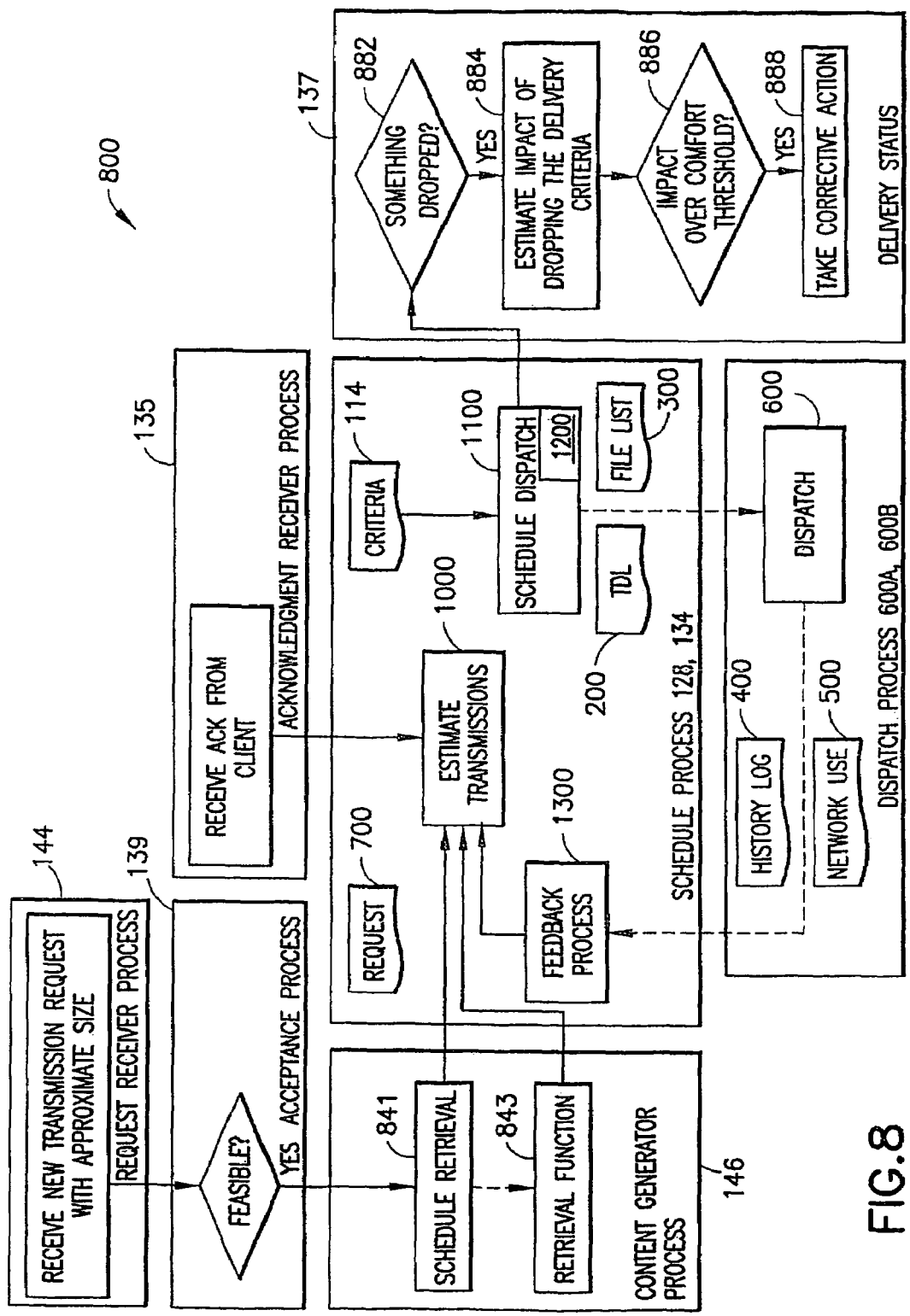
FIG. 8 is a block diagram of the architecture of the scheduler with an optional estimate transmissions process.

FIG. 8 is a block diagram of the architecture 800 of the scheduler (128, 134) with an optional estimate transmissions process 1000 and other related functions. The architecture 800 is a system and method for scheduling digital information transmission and retransmission on a network during time slots.

Transmission requests 700 are received from a client 180 by the request receiver process 144, described in FIG. 1 above. The transmission request 700 contains transmission constraints 770 such as transmission timing information as explained in the description of FIG. 7 (and in example in FIG. 7A) and, in a preferred embodiment, pricing information. In some embodiments, the request receiver process 144 would notify the client 180 whether or not the transmission request 700 was accepted by the system 100. For example, a notice would be sent to the client 180 if the billing cost amount 734 was too low for the service requested or if the network could not accommodate the transmission constraints (740, 742, 744, 746, 748, 752, 722), typically 770.

The received transmission request 700 is passed to an acceptance process 139, described in FIG. 14 below. The acceptance process 139 determines if it is possible to schedule a transmission of the information in the transmission request 700 in accordance to the received transmission constraints 770. In an alternative embodiment, the acceptance process 139 is not used and a delivery status function 137 provides the acceptance function.

If the transmission request 700 for transmission is rejected by the acceptance process 139, the request receiver process 144 is notified (and optionally notifies the client 180) and a next request 700 is received. In a more preferred embodiment, the request receiver process 144 includes alternate transmission constraints 770 categorized by priority so that the acceptance process 139 can reject the transmission request 700 with one or more of the constraints 770 but accept the transmission request 700 with one of the other constraints 770. In an alternative preferred embodiment, the acceptance process 139 would reject the transmission request 700 but would return through the request receiver process 144 to the client 180 alternate criteria (e.g. transmission time availability and pricing) which is used in a negotiating process between the system 100 and the client 180 to come to an acceptable transmission constraints 770 for the transmission request 700. In another embodiment, the client 180 submits multiple transmission requests 700 with different transmission constraints 770, probably starting with the most constrained transmission request 700 first. The client 180 continues submitting transmission requests 700 until the system 100 accepts one.

If a transmission request 700 is accepted, it is passed to a content generator process 146 as described in FIG. 1 above. The content generator 146 has two functions: a schedule retrieval function 841; and a retrieval function 843. The schedule retrieval function 841 determines if the file 112A to be transmitted to satisfy the transmission request 700 is available, e.g. in the system mass storage 110. If the file 112A is available, the file is associated with the accepted transmission request 700 that contains the transmission constraints 770 for the file 112A. If the file 112A is unavailable, the schedule retrieval function 841 requests the retrieval function 843 to take an action to access the associated file 112A. Such actions might include: notifying an operator to load a disk, tape, or CD; sending a request over the network, e.g. to the client 180 to transmit the file 112A. The access of the file 112A that is not available in the system memory 110 may occur hours or days after the request receiver process 144 receives the transmission request 700. Preferably, the file 112A will be brought into the mass storage/system memory 110 before the time specified in the transmission release time 742. If the file 112A is accessed late, corrective action will be taken by the feedback process 1300 as described in FIG. 13 below. Note that the files 112A may be stored in the mass storage 110 and at different times be sent by different transmission requests 700.

In a preferred embodiment, the retrieval function 843 access the files 112A and ensures that they are in the memory 110. Upon receiving a file 112A into memory 110, the retrieval function 843 (a) associates the file 112A with the transmission request 700 and (b) stores the actual file 112A size in the expected data file size field 722. The association (a) is done because the location of the file 112A in the mass storage/system memory 110 may not be known until the file is received into memory 110. The expected data file size field 722 is updated (b) upon receipt of the file 112A because the exact size of the file 112A may also not be known until the file 112A is received and may be relevant to the pricing of the transmission.

The schedule retrieval 841 and retrieval 843 functions may be separate processes or performed as part of other processes in the system 800 (e.g. the request receiver process 144).

The schedule process (128, 134) contains an estimate transmissions process 1000 which receives an accepted transmission request 700 and its associated file 112A. This process 1000, modified by feedback process 1300 and an optional acknowledgment receiver process 135, repeatedly creates and/or modifies delivery criteria records 914 in the delivery criteria list 114 to schedule the transmission of the file 112A to meet the transmission constraints 770. The estimate transmission process 1000 is described in more detail in FIG. 10, below. The acknowledgment receiver process 135 is described in more detail in FIG. 13, below. The delivery criteria records 914 of the delivery criteria list 114 are described in more detail in FIG. 9, below.

In a preferred embodiment, entries in the transmission decision list 200 and file list 300 described above in the description of FIGS. 2 and 3, are created by the schedule dispatch process 1100 and network use allocation process 1200, see FIGS. 11 and 12 below, based on information in the scheduled delivery criteria list 114. These lists (200, 300) are used by the dispatching process 600 (600A, 600B) to transmit the files 112A and to generate the history log 400 and the network use criteria table 500 as described in FIGS. 4, 5, and 6 above. The history log 400 and network use criteria table 500 are used in the feedback process 1300.

Hence, this architecture 800 is used in and further defines the system 100 where digital information (e.g. Files 112A) are accepted for transmission (request receiver process 144, acceptance process 139), scheduled (estimate transmissions process 1000, schedule dispatch process 1100, network use allocation process 1200), and transmitted (dispatch process 600).

Note that the associated file 112A may or may not be present in the memory 110 at the time process 1000 adds and/or modifies delivery criteria records 914 in the delivery criteria list 114. Therefore, the system 800 allows reserving a transmission time with certain delivery criteria records 914 without having the actual file 112A to be transmitted. In this way, the file 112A, meeting the transmission constraints 770, can be under development up until the time the transmission request 700 requires transmission. This feature is useful in transmitting dynamic data, e.g. news or weather data, which is unavailable until just before the transmission time in the transmission constraints 770. The feature is also useful in reserving a transmission time for data which is being developed in parts and transferred at various times and unified at a distant location. In this case, a daily time is reserved for transmission of files for information to be used, assembled, and examined in a collective work at another location.

For example, an on-line university may transmit a digitized lecture which is a portion of a digitized course one or two times a week at a certain time to its students. The availability of each lecture, as measured in terms of the time before transmission may vary. And the size of each lecture, as measured in terms of the file length of the compressed and/or digitized data file may vary. Some lectures may contain large image files, MPEG video, and lecture notes, while other lectures may just contain voice.

In one preferred embodiment, delivery criteria records 914 for files 112A that are unable to be scheduled in conformance with their associated transmission constraints 770 are dropped. This could occur due to dynamic changes in the system 100, e.g. delays, unforeseen increases in file sizes 722 which are delivered prior to the delivery criteria record 914, or time-out situations 615, or a transmission request 700 with a higher priority taking precedence of the system 100 resources. In a preferred embodiment, when delivery criteria records 914 are dropped, the schedule dispatch process 1100 sends a signal to a delivery status module 137.

The delivery status module 137 first receives the dropped signal 882. For delivery criteria records 914 that are dropped, the delivery status module 137 estimates 884 the impact of dropping the delivery criteria record 914. This is done by determining to what extent other delivery criteria records 914 associated with the same file 112A have been satisfied. For example, if the file 112A of a dropped delivery criteria record 914 is scheduled for periodic retransmission and it is expected that these future retransmissions would satisfy the transmission constraints 770 for all or some of the recipients 750, no action may be required at this time, but may be required later. However, if this time is the only time the file 112A is transmitted and the file has a high priority a dropped delivery criteria record 914 might have to be rescheduled at a later time, and this rescheduling may affect the current dispatch schedule.

Step 886 determines if the impact of dropping a delivery criteria record 914 exceeds a threshold. If the impact exceeds a threshold, corrective action 888 is taken.

For example, in one preferred embodiment dropping any delivery criteria record 914 exceeds the threshold 886 and the action taken 888 would be to alert an operator. In an alternative embodiment, the number of delivery criteria records 914 dropped is counted and if the count exceeds a count threshold, a program such as Tivoli is alerted to increase the network bandwidth allotted to the system 100, when delivery criteria records 914 are being dropped due to network bandwidth problems. (Tivoli is a registered trademark of the IBM Corporation). In a further alternative embodiment, the system 800 determines why a delivery criteria record 914 was dropped and the corrective action 888 taken is to reschedule transmission with a new delivery criteria record 914 that permits the file 112A to be transmitted.

In another alternate embodiment, the corrective action 888 taken is for the scheduler (128, 134) to reschedule a transmit time after the digital information (portion of file 112A) is rejected (dropped). The scheduler (128, 134) may also contain a rejection queue and reclamation policy. In this alternate embodiment, as transmissions for files 112A are dropped, they are placed on the rejection queue. A rejection policy within the estimate transmissions process 1000, FIG. 10 below, and/or within the Schedule Dispatch process 1100, FIG. 11 below, pulls entries from the rejection queue when as network bandwidth becomes available or when acknowledgments 135 are received and transmission constraints 770 are satisfied sooner than expected.

In another alternate embodiment, the corrective action 888 taken is to alert the acceptance process 139 of a network bandwidth shortage. Upon receiving the alert, the acceptance process 139 would refuse (or limit) the acceptance of transmission requests 700 with transmission constraints 770 that required transmission during a time window around the network bandwidth shortage time period. For example, in this alternate embodiment, the acceptance process 139 would refuse transmission requests 700 during days (peak hours, off-peak hours, . . . ) where one or more preexisting delivery criteria records 914 were dropped. Or, the acceptance process 139 could refuse transmission request 700 higher than a given priority during time periods of known network congestion.

An alternative corrective action 888 is described in the acceptance process 139, FIG. 14, below.

Figure 9:
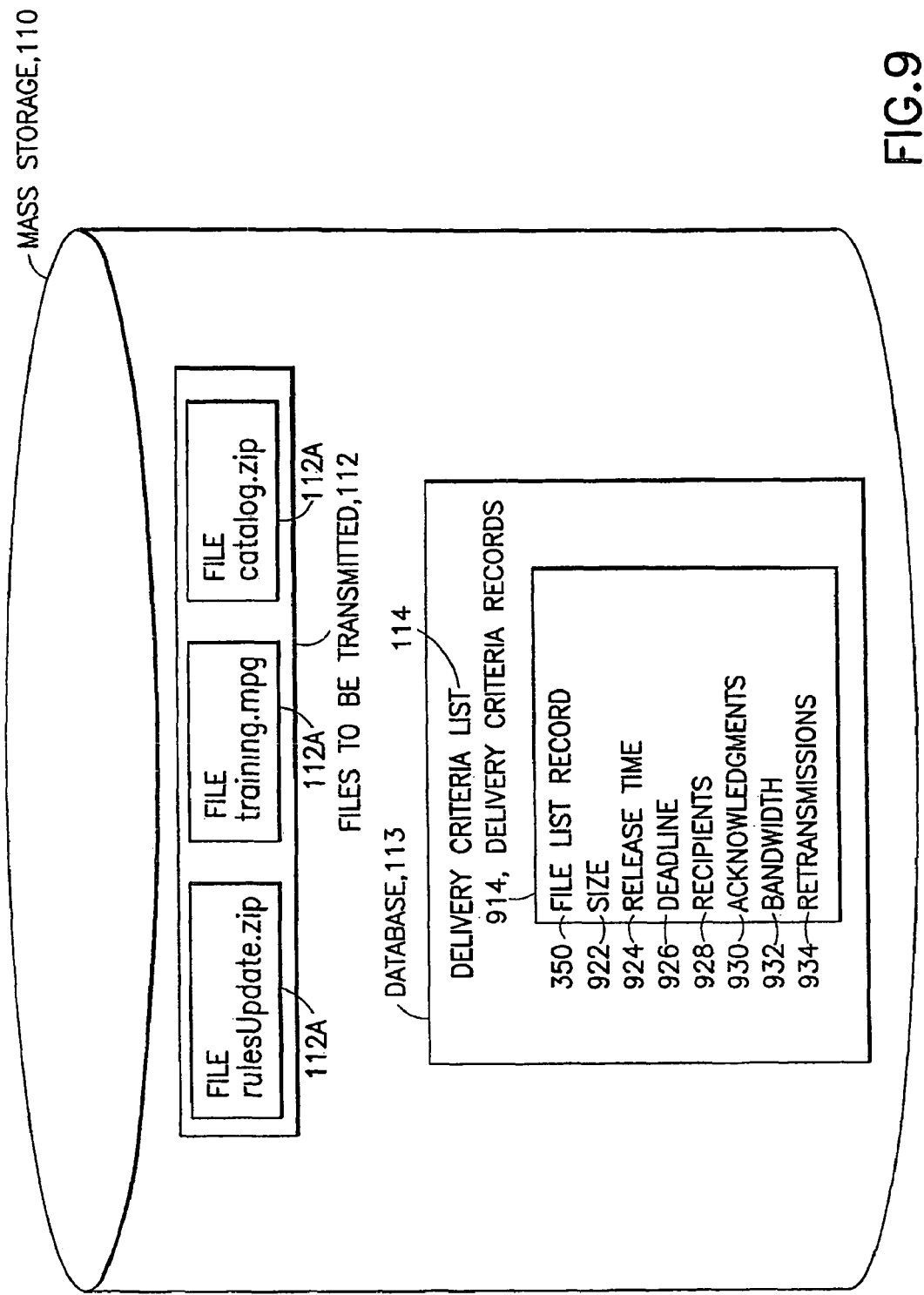
FIG. 9 is a block diagram of one preferred storage filing system.

FIG. 9 is a block diagram of one preferred storage filing system 110. The storage system comprises any known storage means 110 which contains one or more filing system data structures 112. These filing systems 112 contain files 112A to be transmitted by the system 100. The storage system 110 also comprises a database 113 which contains a delivery criteria list 114. The delivery criteria list 114 has a plurality of records, typically 914. Each delivery criteria record 914 has the following fields: a file list record 350 (see description, FIG. 3, above); a file size 922; a release time 924; a deadline 926; one or more optional recipients 928; an acknowledgment designator 930; an optional bandwidth 932; and an optional retransmission designation 934.

In a preferred embodiment, the delivery criteria records 914 of the delivery criteria list 114 are created and maintained by the estimate transmissions process 1000, described in FIG. 10, below. The process 1000 creates one or more delivery criteria records 914 for each transmission request 700 and each record 914 represents a transmission of the transmission request's associated data file 112A. Delivery criteria records 914 may also represent a retransmission of some or all portions of an associated data file 112A.

Each delivery criteria record 914 contains (or references) a file list record 350. This file list record field 350 identifies the file 112A which is to be transmitted to satisfy the delivery criteria record 914.

The file size field 922 is any well known quantization of the size of the file (350, 112A) to be transmitted. Typically the file size 922 is given in byte lengths. The release time field 924 is the time after which the file (350, 112A) should be transmitted. The deadline field 926 is the time before which a transmission of the file (350, 112A) should complete. Note that these times can also be specified by a release time 924 and a send window time, or a deadline 926 and a send window time.

The optional recipients 928 designate the location/people that are to be sent the file (350, 112A). Recipient information 928 is typically used with retransmissions 934 and/or acknowledgments 930 are used. In a broadcast situation, the recipients need not be specified because everyone on the network will be sent the file (350, 112A).

The optional acknowledgment field 930 is used to indicate when an acknowledgment is required from one or more of the recipients. One type of acknowledgment 930 indicates that a recipient received the file (350, 112a), or parts of the file (350, 112a). Another type of acknowledgment, a negative acknowledgment, indicates that the recipient did not receive the file (350, 112a) or did not receive parts of the file. For example, if a recipient expected a file (350, 112a) at 10:00 PM and did not receive it, it would send a negative acknowledgment. If a recipient received a portion of a file (350, 112a) and another portion of the file (350, 112a) was not received (e.g. due to being timed out 615, or due to network 150, 159 error), the recipient would send an acknowledgment indicating partial reception. In some embodiments of the system, this would cause a retransmission 934 to take place.

The optional bandwidth field 932 defines the bandwidth requirements for a particular file (350, 112a) transmission. The bandwidth requirements can depend on the capabilities of the recipients, the quality of service that a subscriber paid for, and/or the physical requirements of the file (350, 112a). (Constant bit rate video requires a minimum bandwidth for real-time playback).

The optional retransmission field 934 indicates that a client 180 requires retransmission of the file if no acknowledgment or negative acknowledgment is received by any of the recipients. Retransmissions 934 must conform to deadline (615, 926) and bandwidth (625, 932) availability requirements.

An example of a delivery criteria list 114 is shown in FIG. 9A. This non limiting example is a continuation of the example given in FIG. 7A. Referring to FIG. 7A, a subscriber such as a product or service provider, e.g. an insurance company providing digitized training videos, located at the source address 710, to its representatives (recipients 750), requests that the videos 710 be sent out over a weekend in order to be used in a course in the following week (transmission deadline 744). The company (billing account 730) requests a quality of service which provides ten megabits of bandwidth (bandwidth constraint 752), collection of acknowledgments 760 from the representatives, and a maximum of two retransmissions (retransmission count 748). The video is 3.6 Gigabytes long (expected data file size 722), approximately two hours of MPEG-2 compressed audio and video, and there are two groups of recipients: group B, the insurance agents, and group D, state regulators (see values in recipients field 750).

Now referring to FIG. 9A. There are five delivery criteria records 914(A, B, C, D, E) in the example delivery criteria list 114. Delivery criteria records 914A, 914B, and 914C are criteria for the transmission and retransmission of the transmission request shown in FIG. 7A. Delivery criteria record 914A requests a transmission of the 3.6 GB (size 922) file 112A "training.mpg" (source file identifier 310 in file list record 350) to be performed between 21:00 Friday (release time 924) and 23:00 Friday (deadline 926) to the recipient groups B and D (recipients 928) with acknowledgments 930 at a bandwidth of 10 Mbps (bandwidth 932). Delivery criteria record 914A also indicates that two retransmissions 934 may follow. Delivery criteria records 914B and 914C are identical to delivery criteria record 914A except that they have different release times 924 (21:30 Friday and 23:00 Friday, respectively) and different retransmissions fields 934 (containing values of one and zero, respectively).

Delivery criteria records 914D and 914E are the criteria records for other transmission requests 700. Delivery criteria record 914D requests a transmission of the 375 MB (size 922) file 112A "rulesUpdate.zip" (source file identifier 310 in file list record 350) to be performed between 21:30 Friday (release time 924) and 22:00 Friday (deadline 926) to the recipient groups A and B (recipients 928) with no acknowledgments 930 or retransmissions 934 at a bandwidth of 5 Mbps (bandwidth 932). Delivery criteria record 914E requests a transmission of the 750 MB (size 922) file 112A "catalog.zip" (source file identifier 310 in file list record 350) to be performed between 22:00 Friday (release time 924) and 22:30 Friday (deadline 926) to recipient group C (recipients 928) with no acknowledgments 930 or retransmissions 934 at a bandwidth of 10 Mbps (bandwidth 932).

In this example, delivery criteria 914A, 914B, and 914C request three transmissions of their associated file 112A. The three transmissions are to be scheduled with release times 924 that are thirty minutes apart. Thirty minutes being the retransmission interval 746 of sample transmission request 700A.

Note that delivery criteria 914B and 914D have the same release time 924 value.

In this example, the system 100 sent the entire package during an available network slot on Friday night 924. However, due to a cut cable network outage, the regulators (recipients 928 group D) did not receive the package and did not send an acknowledgment. Also, because of client limitations, the agents (recipients 928 group B) only received half of the package. Since the agents only acknowledged receipt of half of the package, and no acknowledgment was received from the regulators, the entire package was retransmitted to the regulators and the missing half was retransmitted to the agents. These functions were performed by the scheduling process (128, 134). Criteria for different transmission requests 700 are given in each of the records (typically 914) of the delivery criteria list 114 containing the delivery criteria records 914.

Figure 10:
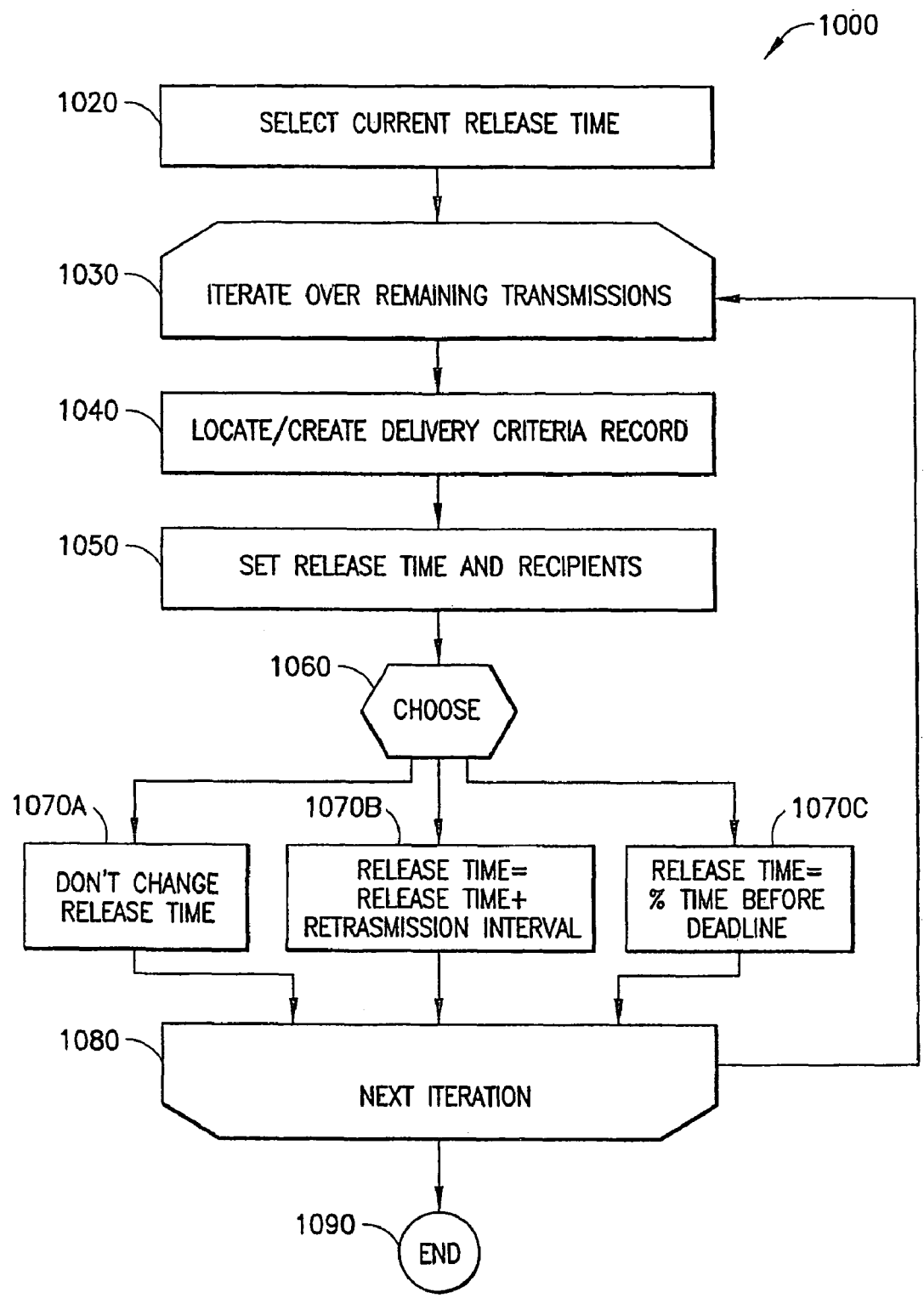
FIG. 10 is a flow chart of an estimate transmissions process which receives an accepted transmission request and its associated file and creates records in the delivery criteria list so that the file will be transmitted by the system.

FIG. 10 is a flow chart of an estimate transmissions process 1000. This process 1000 receives accepted transmission requests 700 and creates records 914 in the delivery criteria list 114 so that the associated files 112A will be transmitted by the system 100. The schedule process (128, 134) executes the estimate transmissions process 1000 each time a new transmission request 700 is accepted 841 into the system (128, 134), and each time information is generated (e.g. an exact file 112A size is determined, a prior transmission of the file 112A completes 1300, and acknowledgments 135 are received from clients 160, 170) regarding the transmission request 700. When executed, the estimate transmissions process 1000 will modify the delivery criteria list 114 so that the file 112A will be transmitted (and/or retransmitted) over the network (150, 159).

The estimate transmissions process 1000 begins 1020 by determining a current release time which is the earliest time a transmission of the file 112A can take place. The current release time 1020 is the greater of the transmission release date 742 specified in the accepted transmission request 700 and the current system time 125. The process 1000 then iterates 1030 over the transmissions which need to be scheduled making a delivery criteria record 914 in the delivery criteria list 114 for each required transmission. When the process 1000 is first called with a newly accepted transmission request 700, the process 1000 will iterate once to create a delivery criteria record 914 for an initial transmission of the file 112A, and then will continue to iterate, once per requested retransmission 748, to create delivery criteria records 914 for retransmissions of the file 112A. When the process 1000 is called after one or more transmissions and/or retransmissions have taken place, the process 1000 iterates 1000 to modify the remaining delivery criteria records 914, e.g. to reset the release time (e.g. if bandwidth is freed up), and/or to adjust the size (e.g. if part of the transmission was sent and acknowledged).

The process 1000 creates and selects 1040 a delivery criteria record 914 in the delivery criteria list 114 for each transmission which is to take place. If the process 1000 has already created a delivery criteria record 914 for this transmission during a prior execution, the previously created delivery criteria record 914 is simply selected in the delivery criteria list 114 and not recreated. This is to avoid having duplicate records 914 in the delivery criteria list 114.

When the process 1000 creates 1040 a delivery criteria record 914, it sets the fields of the new delivery criteria record 914 as follows: the size 922 field is set to the size of the file 112A; the deadline field 926 is set to the transmission deadline 744 of the transmission request 700; the recipients field 928 is set to the recipients 750 field of the transmission request 700; the acknowledgments field 930 is set to the acknowledgments field 760 of the transmission request 700; the bandwidth field 932 is set to the bandwidth constraints field 752 of the transmission request 700; and the optional retransmissions field 934 is set to the retransmission count field 748 of the transmission request 700. Further, the process 1000 sets the fields of the file list record 350 contained in the delivery criteria record 914 as follows: the source file identifier 310 is set to the location of the file 112A in mass storage 110; the cursor field 315 is set to indicate the start of the file (typically set to 0); and the destination address 320 field of the file list record 350 within the delivery criteria record 914 is set to a network address for the listed recipients 750.

In both cases, i.e. for new and existing delivery criteria records 914, the process 1000 continues to step 1050 where the release time 924 field of the selected delivery criteria record 914 is set to hold the current release time 1020 value. Step 1050 also sets the recipients field 928 of new and existing delivery criteria records 914. In a preferred embodiment, the recipients field 928 is set to the groups of recipients 750 who have not yet acknowledged receipt of the entire file 112A. In alternate embodiments, the recipients field 928 is set to the group of recipients listed in the recipients field 750 in the transmission request 700.

Through these two steps (1040, 1050), the process 1000 has created/modified a delivery criteria record 914 that will cause a transmission/retransmission of the file 112A to be scheduled by the schedule dispatch process 1100, described in FIG. 11 below, and dispatched by the dispatching process 600.

The process 1000 continues to determine 1060 the parameters for a next retransmission of the file 112A. There are many different ways that values can be selected for the fields (e.g. the release time 924, and the deadline 926) of the delivery criteria record 914 for a next retransmission. Steps 1070A, 1070B, and 1070C show three distinct ways of determining a next release time 924 for a next retransmission. Steps 1070 A, B, and C are different preferred embodiments of the invention. In some embodiments, these steps can be user selected. One step would be selected over another by balancing ease of scheduling with network bandwidth use and expected data loss.

Step 1070A maintains a constant release time 1020 throughout the delivery criteria records 914. Step 1070B increments the current release time 1020 by the retransmission interval 746 value of the transmission request. And step 1070C allots a portion of the time between the initial release time set in step 1020 and the deadline to each transmission/retransmission. This is easier to schedule but could use more network bandwidth.

Choosing to perform step 1070A makes all delivery criteria records 914 for the transmission request 700 have the same release time 924. This means that the schedule dispatch process 1100 may schedule the retransmissions to take place simultaneously. And, because each delivery criteria record 914 has the largest possible window of time between its release time 924 and deadline 926 this step 170A has the greatest likelihood of creating feasible schedules.

Choosing to perform step 1070B causes the release times 924 of the delivery criteria records 914 to be staggered throughout the window between the transmission release date 742 and the transmission deadline 744. Each successive delivery criteria record 914 has a release time 924 which is offset from the previous delivery criteria's release time 924 by the retransmission interval 746. By staggering the release times 924, transmissions of a file 112A are more likely to not to be broadcast over the network 150, 159 simultaneously. And, by basing the release time 1020 logic on the value of a field (i.e. the retransmission interval 746), the characteristics of the system 100 can be changed by altering the retransmission interval 746 value. Step 1070B potentially uses less bandwidth than step 1070A and gives flexibility in scheduling the retransmissions.

Choosing to perform step 1070C causes the release times 924 of the delivery criteria records 914 to be evenly distributed between the window of the transmission release date 742 and the transmission deadline 744. This further lessens the likelihood of simultaneous transmissions and tends to cause the transmissions to be dispatched distributed throughout the window. However, as the release time 924 of a delivery criteria record 914 nears the deadline 926 of the delivery criteria record 914, the chances that the delivery criteria record 914 may not be able to be scheduled by the dispatch schedule process 1100 increase. Step 1070C potentially uses less network bandwidth than step 1070A and 1070B but does not allow flexibility in scheduling the retransmissions.

Step 1070B is performed in a preferred embodiment. Alternative embodiments may perform either steps 1070A or 1070C. Delivery criteria records 914A, 914B, and 914C in FIG. 9A, above, show the result of executing process 1000 with step 1070B against transmission request 700A, described in FIG. 7A.

Note that because the deadline 926 of the delivery criteria record 914 is kept constant by each of the steps (1070A, 1070B, 1070C), the steps all generate delivery criteria records 914 which may result in simultaneous transmissions. Further, all transmissions may be scheduled at the latest time possible by the dispatch scheduler. Alternative embodiments may modify the deadline 926 of delivery criteria record 914 in order to guarantee that a transmission is completely dispatched well before its transmission deadline 744 and in time for acknowledgments to be received and processed by the acknowledgment receiver process 135.

In another alternative embodiment, the estimate transmissions process 1000 may only generate a delivery criteria record 914 for one retransmission (rather than all retransmission count 748 retransmissions). This would be done by iterating once in step 1030 instead of iterating over all transmissions. In this alternative embodiment, simultaneous transmissions of the same file 112A would not occur because only one delivery criteria record 914 for the transmission request 700 would be in the database at any one time. As the feedback process 1300 indicated that the transmissions were completed, and as acknowledgments were received by process 135, successive delivery criteria record 914 could be created for any necessary retransmissions.

Once the parameters are determined for the next delivery criteria record 914 the process proceeds to step 1080 where a next iteration of step 1030 takes place. Once all transmissions have been iterated 1030 over, the process ends 1090.

Figure 11:
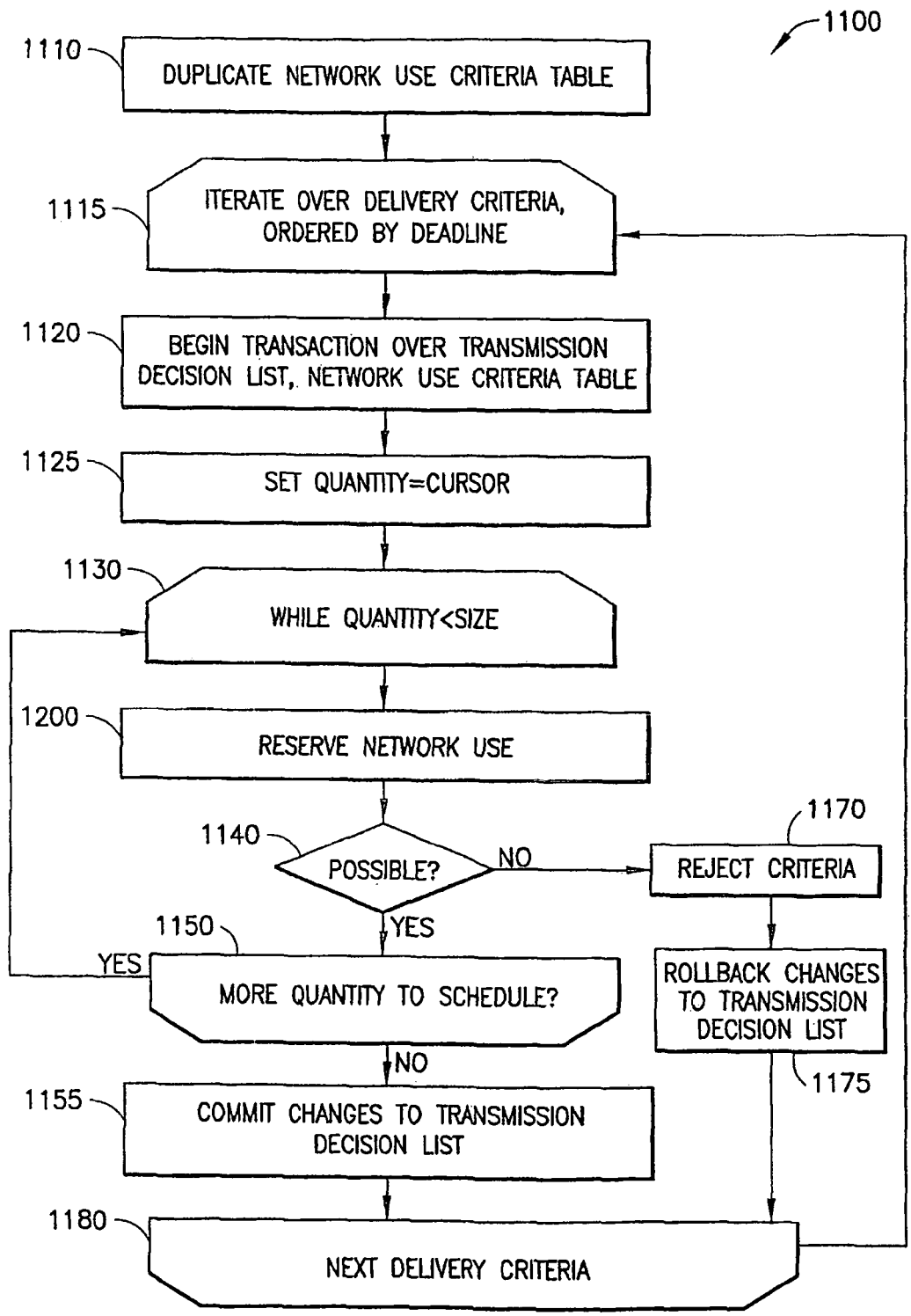
FIG. 11 is a flow chart of a scheduling process using a novel network use allocation process.
Figures 12, 12A:
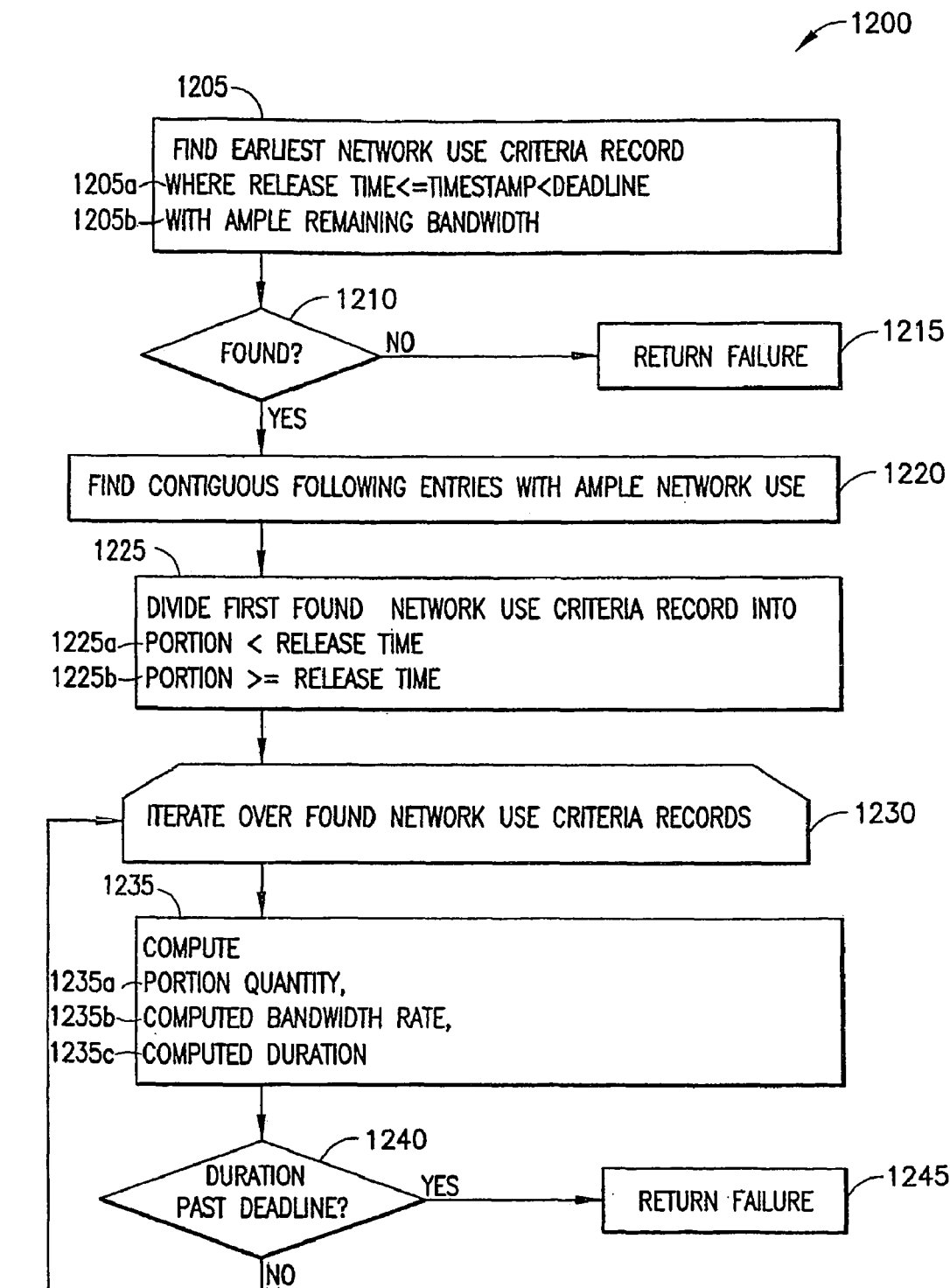
FIG. 12 is a flow chart of a novel network use allocation process.
Figure 12B:
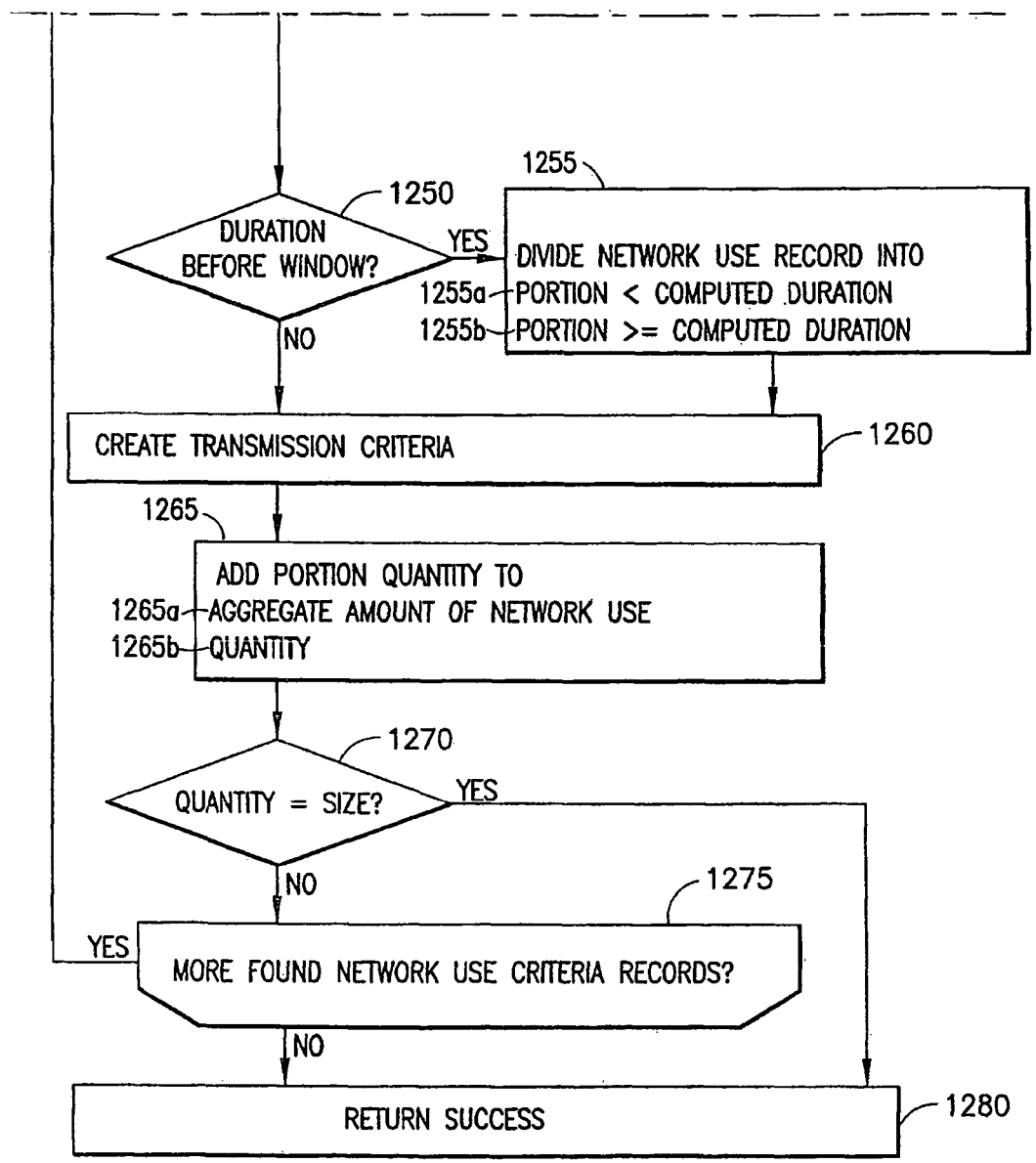

The scheduling processes 1100, FIGS. 11, and 1200, FIG. 12, novely use Earliest Deadline First (EDF) scheduling techniques while accounting for network bandwidth limitations to determine if files 112A can be dispatched 600 within the required time period subject to networking and transmission constraints.

FIG. 11 is a flow chart of a scheduler process 1100 that converts information in the delivery criteria list 114 into commands in the transmission decision list 200 that are used by the dispatcher process 600 (600A, 600B). In addition, the scheduler process 1100 determines whether or not the delivery criteria records 914 in the delivery criteria list 114 can be satisfied by the available system 100 resources to transmit files 112A over the satellite 150 and/or over the network 159.

The process 1100 begins, step 1110, by accessing information in the network use criteria table 500. In a preferred embodiment, the information in this table 500 is duplicated 1110.

The process 1100 then iterates 1115 over the delivery criteria list 114. In a preferred embodiment, step 1115 sorts the delivery criteria records 914 in the delivery criteria list 114 by deadline 926, in increasing order, earliest deadline first.

Step 1120 determines a record, e.g. by setting a pointer, in the transmission decision list 200, and saves a prior state of the network use criteria table 500.

Step 1125 initializes a quantity variable to the cursor 315 identified in the file list record 350 of the delivery criteria record 914 selected by the iteration step 1115.

Step 1130 performs another iteration while the quantity variable set in step 1125 is less than the size 922 of the selected delivery criteria record 914. While the condition in step 1130 exists, step 1200 is performed which attempts to tentatively reserve use of the network for the selected delivery criteria record 914 by placing time stamp 505 and defined network use 510 information in the network use criteria table 500, for the respective delivery criteria record 914. See the description of the FIG. 12, below.

Step 1140 determines whether or not process 1200 was able to tentatively reserve the network use, by examining the return code (1215, 1245, 1280 below).

If the return code indicates that the attempted reservation failed (1215, 1245), step 1170 rejects the selected delivery criteria record 914, and optionally sends a drop signal to the delivery status 137. Then step 1175 changes the transmission decision list 200 to remove all the entries 250 associated with the selected record 914. In a preferred embodiment, the removed entries 250 are all those entered after the pointer set in step 1120. Further, step 1175 changes the network use criteria table 500 to restore the network use criteria table 500 to the state prior to the performance of step 1120.

If step 1140 determines that the network use was reserved (1280) in process 1200, step 1150 returns back to step 1130 where a next reservation will be attempted for a next portion of the delivery criteria record 914. If the quantity variable 1125 is equal to the file size 922, step 1155 is performed and finally commits the changes in the transmission decision list 200 and the network use criteria table 500. In a preferred embodiment, this allows the pointer in table 1120 to be moved and the prior state information in table 500 to be overwritten. In a preferred embodiment, these functions (transactions, rollbacks, commits) are performed by standard database techniques.

After step 1155 or step 1175 has completed, step 1180 determines if there is another delivery criteria record 914 to iterate over. If there is, the process 1100 returns to step 1115. If not, the scheduler process 1100 ends.

FIG. 12 is a flow chart of a novel network use allocation process 1200 which tentatively reserves network use in the network use criteria table 500 so that some or all of a transmission for a selected delivery criteria record 914 can be performed. Further, the network use allocation process 1200 creates transmission criteria records 250 which instruct the dispatching process 600 when to begin the selected delivery criteria record 914 transmission.

This process 1200 is executed numerous times during execution of process 1100, FIG. 11 above. While process 1200 is executing, it accesses the delivery criteria record 914 selected in step 1115, process 1100. Process 1200 accesses and modifies the network use criteria table (500, 1110) which is duplicated 1110 at the start of process 1100, possibly adding new network use criteria records 550 to the table 1110. Process 1200 modifies the transmission decision list 200 by creating new transmission criteria 250. And, process 1200 also modifies the value of the quantity variable 1130 maintained by process 1100.

The process 1200 begins 1205, by finding a network use criteria record 550 in the network use criteria table (500, 1110) that meets the following constraints: 1205*a* it has a time stamp 505 which is greater than or equal to the release time 924 but less than the deadline 926 of the selected delivery criteria (914, 1115); and, 1205*b*, has ample remaining bandwidth 530 to support the bandwidth requirements 932 of the selected delivery criteria (914, 1115). In a preferred embodiment, this search 1205 is performed via an iteration of the network use criteria table (500, 1110), ordered by time stamp 505. The time stamp constraint, 1205*a*, causes step 1205 to search for a network use criteria record 550 which indicates the availability of network use during the time window of the delivery criteria (914, 1115). Any network use criteria records 550 which define network use for periods before the release time 924 or after the deadline 926 will be ignored by the constraint 1205*a*.

The bandwidth check constraint, 1205*b*, causes step 1205 to search for network use criteria records 550 which indicate that there is enough bandwidth available in the network to transmit some or all of the file 112A of the selected delivery criteria (914, 1115). In a preferred embodiment, the bandwidth check 1205*b* consists of comparing the bandwidth requirements 932 against the remaining bandwidth 530 of the network use criteria record 550. When the bandwidth requirements 932 specify a bandwidth which is less than or equal to the remaining bandwidth 530, the bandwidth check constraint 1205*b* is considered met. When the bandwidth requirements 932 specify a bandwidth which is greater than the remaining bandwidth 530, the bandwidth check constraint 1205*b* rejects the network use criteria record 550 as a candidate for step 1205.

In a preferred embodiment step 1205 will select the network use criteria record 550 with the earliest time stamp 505 that meets the constraints (1205*a*, 1205*b*).

If no network criteria records 550 exist which meet the constraints (1205*a*, 1205*b*), the process 1200 sets a failure indicator 1215 and returns. This will cause execution of process 1100 to move to step 1170 where the selected delivery criteria (914, 1115) will be dropped from the transmission schedule.

If a network use criteria record 550 is found, step 1210, execution of process 1200 continues to (optional) step 1220. In step 1220, process 1200 performs a second search of the network use criteria table (500, 1110). The process 1200 searches to find the set of zero or more additional network use criteria records 550 which satisfy the constraints (1205*a*, 1205*b*) and which are contiguous in time. That is, the process 1200 finds each record 550(*a*) in the network use criteria table (500, 1110) which satisfies constraints (1205*a*, 1205*b*) and where there does not exist a second record 550(*b*) having a time stamp 505(*b*) with a value between the time stamp 505 of the found record 1205 and the time stamp 505(*a*) that does not satisfy the constraints (1205*a*, 1205*b*).

By performing these searches (1205, optionally 1220), the process 1200, locates a range of time where there is enough network use available to transmit some or all of the file 112A for the selected delivery criteria (914, 1115).

In a preferred embodiment, network use criteria records 550 can be iterated over in the network use criteria table 500, by order of increasing time stamp 505. This means that the searches (1205, 1220) can be performed easily and in linear time.

After finding contiguous network use criteria records 550, execution continues to step 1225 where the process 1200 begins to reserve bandwidth for a transmission. The process 1200 portions the first found 1205 network use criteria record 550 into two new network use criteria records 550, 1225*a* and 1225*b*. The first network use criteria record 1225*a* holds bandwidth/network use allocated for a window of time after the time stamp 505 of the network use criteria record (550, 1205) but before the release time 924 of the selected delivery criteria record (914, 1115). The second network use criteria record 1225*b* holds the remainder of the bandwidth/network use form the first found 1205 network use criteria record 550.

The fields of network use criteria record 1225*a* are set as follows: values for the time stamp 505 and (optional) network identifier 520 fields are copied from the respective fields of the first found 1205 network use criteria record 550. And the aggregate 515 and defined network use 510 fields are set to a proportion of the aggregate 515 and defined network use 510 fields, respectively, of network use criteria record 1205 equal to the proportion of the window between the release time 924 and the time stamp 505, compared to the network use window 525.

The fields of network use criteria record 1225*b* are set as follows: the value of the (optional) network identifier 520 field is copied from first found 1205 network use criteria record 550. The time stamp 505 field is set to the release time 924 of the selected delivery criteria (914, 1115). And the aggregate 515 and defined network use 510 fields are set to the remaining proportion of the aggregate 515 and defined network use 510 fields, respectively, of network use criteria record 1205 equal to the proportion of the window between the release time 924 and end of the network use window 525, compared to the network use window 525.

After creating network use criteria record 1225*b*, the process 1200 removes network criteria record 1205 from the network criteria table (500, 1110). And the process 1200 sets the first found network use criteria record 1205 to be network use criteria record 1225*b*.

For example, suppose that the release time 924 of the selected delivery criteria (914, 1115) occurs five minutes after the time stamp 505 of network use criteria record 1205. And suppose that the network use window 525 field of the network use criteria record 1205 contains a value of twenty minutes. Further, suppose that network use criteria record 1205 defines 100 units of network use 505 and has an aggregate amount of network use 510 of 60 units. Then, the release time 924 occurs ¼ of time into the network use window 525. Thus, new network use criteria record 1225*a* would have a defined network use of 25 units and an aggregate amount of network use 515 of 15 units. And new network use criteria record 1225*b* would have a defined network use of 75 units and an aggregate amount of network use 515 of 45 units.

In cases where the time stamp 505 of network use criteria record 1205 is greater than or equal to the release time 924 of the selected delivery criteria (914, 1115), network use criteria records 1225*a* and 1225*b* are not created by step 1225.

By performing step 1225, the process 1200 has now found a range of network use criteria records (the record 550 found in step 1205 and possibly replaced by new record 1225*b*, and those records 550 found in step 1220) all of which have time stamps 505 which are equal to or greater than the release time 924 of the selected delivery criteria (914, 1115).

Process 1200 now iterates 1230 over the found network use criteria records 550, selecting each network use criteria record 550 ordered by time stamp 505.

During each iteration 1230, the process 1200 computes, step 1235, a portion quantity 1235*a* of data which needs to be transmitted to satisfy the selected delivery criteria (914, 1115). This portion quantity 1235*a* is equal to the value in the size 922 field of the selected delivery criteria record (914, 1115) less the amount in the quantity variable 1130 of process 1100. The process 1200 then determines a computed bandwidth rate 1235*b* suitable for the selected network criteria 550 and divides the portion quantity 1235*a* by the computed bandwidth rate 1235*b* to compute a duration value 1235*c*.

Step 1235 is a time to transmit process which determines the time to transmit a portion of a file 112A within the constraints of the delivery criteria record 914, transmission criteria 770, and available network use 550. In alternative embodiments, these transmission criteria 770 can further include the time of day and/or size of network buffers (124A, 124B).

In a preferred embodiment, the computed band-width rate 1235*b* is set to the bandwidth 932 specified in the selected delivery criteria record (914, 1115). In alternate embodiments, the computed bandwidth rate 1235*b* may vary if the bandwidth 932 specifies a range of allowable bandwidth values. In these alternate embodiments, the computed bandwidth rate 1235*b* may be set to a preferred bandwidth value which is specified 932 in the selected delivery criteria record (914, 1115) and which there is space for (remaining bandwidth 530) in the selected network use criteria record 1230.

If the computed duration value 1235*c* is greater than the window between the time stamp 505 of the selected network use record 1230 and the next network use record 550, step 1235 adjusts the computed duration value 1235*c* to be equal to the window. And step 1235 adjusts the portion quantity 1235*a* to be equal to the amount of data which can be written in that window, e.g. the computed bandwidth rate 1235*b* multiplied by the new computed duration value 1235*c*.

The process 1200, step 1240, then compares the computed duration value 1235*c* against the deadline 926 in the selected delivery criteria record (914, 1115). When the value of the time stamp 505 of the selected network use criteria record 1230 plus the computed duration value 1231*c* is greater than the deadline 926, execution of the process 1200 moves to step 1245 where the process sets a failure indicator, ends its execution, and returns to process 1100. In this case, the process 1200, step 1245, has determined that there is not enough time and bandwidth available between the time stamp 505 and the deadline 926 to complete the transmission of the file 112A and, hence, a failure code is returned.

When the process 1200 determines that there is enough time and bandwidth to transmit a portion 1235*a* of the file 112A before the deadline, execution moves to step 1250. The process, step 1250, compares the computed duration value 1235*c* to the network use window 525. If the computed duration value 1235*c* holds a time interval smaller than the network use window 525, step 1255 portions the selected network use criteria record 1230 into two new network use criteria records 1255*a* and 1255*b*.

New network use criteria record 1255*a* represents the network use during the time period starting at the time stamp 505 of network use criteria record 1230 and extending to the time interval of the computed duration 1235*c*. Network use criteria record 1255*b* represents the network use for the remainder of the time at and past the duration 1235*c* up to the network use window 525.

The fields of network use criteria record 1255*a* are set as follows: values for the time stamp 505 and (optional) network identifier 520 fields are copied from the respective fields of the selected network use criteria record 1230. And the aggregate amount of network use 515 and defined network use 510 fields are set to a proportion of the aggregate amount of network use 515 and defined network use 510 fields, respectively, of network use criteria record 1230 equal to the proportion of the window between the duration 1235*c* and the network use window 525 of the selected network use criteria record 1230.

The fields of network use criteria record 1255*b* are set as follows: the value of the (optional) network identifier 520 field is copied from first found 1205 network use criteria record 550. The time stamp 505 field is set to the value of the time stamp 505 of the selected network use criteria record 1230 plus the duration 1235c. And the aggregate amount of network use 515 and defined network use 510 fields are set to the remaining proportion of the aggregate amount of network use 515 and defined network use 510 fields, respectively, of network use criteria record 1230 equal to the proportion of the time between the duration 1235c and the network use window 525.

After creating network use criteria records 1255a and 1255b, the process 1200 removes network criteria record 1230 from the network criteria table (500, 1110). And the process 1200 sets the selected network use criteria record 1230 to be network use criteria record 1255a.

Execution of the process 1200 then continues to step 1260. Step 1260 will also be executed (and step 1255 bypassed) when step 1250 finds that the computed duration 1235c is equal to the network use window 525.

Step 1260 creates a new transmission criteria 250 record for the transmission criteria table 200. This transmission criteria 250 record instructs the dispatching process 600 to send a portion of the file 112A for the selected delivery criteria (914, 1115). The fields of the new transmission criteria 250 are set as follows: the index 205 is set to the index 305 of the file list record 350 in the selected delivery criteria record 914; the release time 210 is set to the time stamp 505 of the selected network use criteria record 1230; the quantity completion measure 235 is initialized (set to zero in a preferred embodiment); and the status code 240 is set to a "Pending" value.

In a preferred embodiment, step 1260 sets the burst size 225 and burst rate 230 fields to values for the computed bandwidth rate 1235b determined in step 1235. The portion quantity field 215 is set to the computed portion quantity 1235a, and the duration field 220 is set to the computed duration 1235c. In alternate embodiments, the duration field 220 may be left unspecified, set to the value of the deadline 926 in the selected delivery criteria record (914, 1115), or set to the value of the time stamp 505 in the next network use criteria record 550.

Step 1260 has now created a new transmission criteria 250 record requesting that the dispatching process 600 transmit a portion of the file 112A for the selected delivery criteria record (914, 1115). Execution of process 1200 moves to step 1265 where 1265a the value of the computed portion quantity 1235a is added to value stored in the aggregate amount of network use field 515 for the selected network use criteria record 1230. This records that network use has been reserved for the new transmission criteria 250 record. Process 1200 further 1265b adds the computed portion quantity 1235a to the quantity variable 1125 of process 1100. Thus quantity variable 1125 is updated to hold the amount of data which has been scheduled for the currently selected delivery criteria (914, 1115).

Step 1270 compares the quantity variable 1125 to the value of the size 922 field in the selected delivery criteria record (914, 1115). If the quantity 1125 is not equal to the size 922, more transmission criteria 250 records need to be created to satisfy the delivery criteria (914, 1115). The process 1200 continues execution to step 1275 where, if there are more found network use criteria records 1230, execution branches back to step 1230.

When the quantity 1125 is equal to the size 922 (step 1256), or when there are no more network use criteria records 1230 to iterate over (as determined by step 1275), execution continues to step 1280 where the process 1200 sets a success indicator value and execution of process 1200 ends.

Note that the constraints (1205a, 1205b) chosen for steps 1205 and 1220 determine the range of time during which a portion of a delivery criteria record 914 may be transmitted. Constraints 1205a, 1205b have been chosen to match the characteristics of the dispatching process (600A, 600B) used in a preferred embodiment of this invention.

Alternative embodiments may use alternate processes, such as the Fazzt Digital Delivery System by KenCast, Inc. to perform the function of the dispatching process (600A, 600B). New constraints in addition to, or in replacement for, constraints 1205a and 1205b may be added to the network use allocation process 1200. For instance, if the alternate dispatching process 600 has a limitation on the number of simultaneous portions of files 112A which may be transmitted at any given time, a constraint 1205c may be introduced to process 1200 which enforces this limit. A constraint 1205c may check that no more than four transmission criteria records 250 exist with release times 210 and durations 220 that overlap the network use window of a candidate (1205, 1220) network use criteria record 550. This alternate constraint 1205c would cause the network use allocation process 1200 to not schedule any more than overlapping simultaneous transmission criteria records 250.

Another alternate constraint 1205d could be put in place to check that there was enough remaining network bandwidth in contiguous network use criteria records 500 so that it was possible to schedule the file 112A for transmission as one portion.

Further, an alternate constraint 1205e could be put in place to limit the cumulative bandwidth delivered to a destination or destination group during a time period. Alternate constraint 1205e could check, for example that no more than a cumulative 10 Mbps was transmitted for a destination, regardless of the number of simultaneous transmissions delivered to the destination.

Process 1100 iterates over the delivery criteria list 114, step 1115, ordered by deadline 926, and the delivery criteria record 914 which have the earliest deadlines 926 are scheduled first. Process 1100 and 1200 use the network use criteria table 500 to schedule based on bandwidth as well as time. Constraint 1205b of process 1200 allows multiple transmissions of portions of files 112A to be scheduled simultaneously during the same time period therefore allowing overlapping and simultaneous scheduling. Step 1265a of process 1200 works with constraint 1205b to keep track of the bandwidth consumed by simultaneously scheduled transmissions so that the cumulative bandwidth scheduled during a time period is not greater than the available bandwidth for the time period.

Further, by allowing multiple network use criteria records 550 to exist, each with a distinct network use window 525, processes 1100 and 1200 can create schedules which are designed for networks (150, 159) with non constant bandwidth availability. As discussed in FIG. 5 above, differing portions of bandwidth may be available to a network during different times of day. For instance, 45 Mbps of network bandwidth may be available during off-peak hours but only 15 Mbps available during peak time.

A preferred embodiment of this invention creates a transmission decision list 200 using processes 1100 and 1200. Alternate embodiments may use other scheduling algorithms such as more complicated EDF algorithms, e.g. the Robust Earliest Deadline (RED) algorithm, or algorithms which schedule by other means, e.g. Rate Monotonic (RM) algorithms. These algorithms may be amended to contain constraints similar to 1205b to check for available bandwidth, and to record aggregate amounts of network use as done in step 1265a. EDF algorithms are discussed in the book *Deadline Scheduling For Real-Time Systems, EDF and Related Algorithms* by John A Stankovic, Marco Spuri, Krithi Ramamritharn, Giorgio C. Buttazzo Copyright 1998 by Kluwer Academic Publishers, ISBN 0-7923-8269-2, which is herein incorporated by reference in its entirety.

Figure 13:
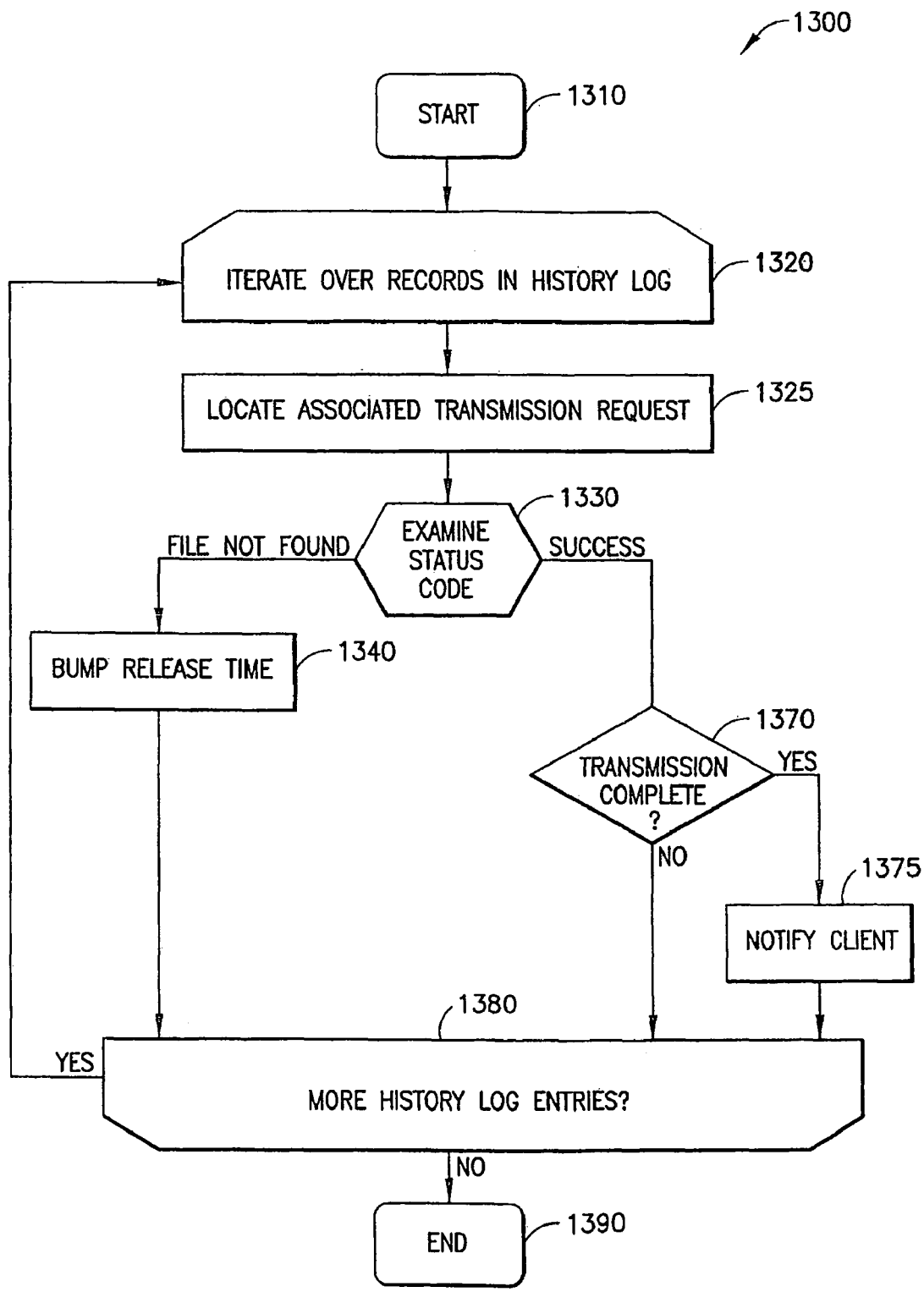
FIG. 13 is a flow chart of a feedback process.

FIG. 13 is a flow chart of an optional feedback process 1300 which examines entries in the file transmission history log 400 and adjusts related transmission requests 700 accordingly.

The process 1300 begins, step 1310, by iterating 1320 over the entries in the history log 400. The history log 400 is populated by the dispatching process 600 (600A, 600B) whenever a portion of a file 112A is transmitted over the network (150, 159). In a preferred embodiment, the process 1300 iterates over history records 450 which have been added to the history log 400 after a previous execution of process 1300. By doing this, history records 450 are not examined twice. The process 1300 can detect newly added history records 450 by examining the value in the completion time stamp 420 field.

Step 1325 locates the transmission request 700 associated with the history record 450. The transmission request 700 can be found through the index 405 field of the history record 450. The index 405 field identifies the file list record 350 and thus identifies the file 112A which has an association with the transmission request 700. Through similar steps of following indirection, the process 1300 can locate the delivery criteria record 914 which contains the file list record 350 associated with the history log 450.

The process 1300 then, step 1330, examines the status code 415 field of each history record 450 selected in step 1320. The status code 415 field contains information regarding an attempted transmission of a portion of a file 112A over the network (150, 159). In a preferred embodiment, the status code 415 is checked to see if it contains one of two values. When the status code 415 contains a "File not found" indicator, the dispatch process 600 attempted to make a transmission but found that the file 112A did not exist in the memory/mass storage 110. In this case, the process moves to step 1340. When the status code 415 contains a "Success" indicator, the dispatch process 600 successfully transmitted a portion of a file 112A over the network (150, 159). In this case, the process moves to step 1370. In alternate embodiments, the status code 415 is checked to see if it contains additional values such as a "Preempted due to network error" or "Preempted due to disk error" and appropriate steps are performed for each of these indicators.

When a file 112A was not found by the dispatch process 600, execution of the process 1300 moves to step 1340. Step 1340 increases the transmission release time 742 of the found transmission request (700, 1325). In a preferred embodiment, the transmission release time 742 is increased by a fixed value, e.g. an hour. In alternate embodiments, the transmission release time 742 may be increased by a value related to the expected data file size 722.

The transmission release time 742 is increased because the data for the file 112A has not yet been completely retrieved from the client 180 by retrieval function 843. Increasing the transmission release time 742 allows the retrieval function 843 to have more of an opportunity to receive the data file 112A.

Note that as the transmission release time 742 is increased and moves closer to the transmission deadline 744, it is more likely that a schedule cannot be created by the schedule process 800 which will satisfy the transmission criteria 770 with available network use 500. By increasing the transmission release time 742, the feedback process 1300 may cause the transmission request 700 to be dropped 882 by the schedule dispatch process 1100. In an extreme case, the transmission release time 742 may be increased past the transmission deadline 744, and transmission request 700 will be dropped 882.

Alternate embodiments of process 1300 may perform an acceptance test 139 to determine if the modified transmission criteria 770 is still acceptable within the system 100.

In further alternate embodiments, the process 1300 drops the transmission request 700 when the file 112A has not been retrieved before the transmission release time 742. This rejection can cause a notification signal, e.g. an e-mail message, to be transmitted to the client 180, informing the client 180 of the dropped request 700, and cause the client 180 to schedule a next transmission of the file 112A by interacting with the request receiver process 144.

After increasing the release time, step 1340, execution of process 1300 moves to step 1380 where, if a next history log record 450 exists, it is selected for iteration and execution branches to step 1320. After all history log records 450 have been iterated 1320 over, execution branches to step 1390 where the process 1300 ends.

When step 1330 finds that the status code 415 contains a "Success" indicator, execution of process 1300 removes to step 1370. Step 1370 examines fields in the file list record 350 and the delivery criteria record 914 associated with the selected history record 450 to determine if a file 112A has been completely transmitted. If the cursor 315 field of the file list record 350 is equal to the size 922 field of the delivery criteria record, all portions of the file 112A have been transmitted, and execution of process 1300 proceeds to step 1375. In a preferred embodiment, step 1375 sends a message to the client 180 indicating that a transmission/retransmission of the file 112A has completed. In alternate embodiments, the process 1300, step 1375, may also send messages to the recipients 928 listed in the delivery criteria record 914. This message would request acknowledgment of the transmitted file 112A and may be sent conditionally based on the value of the acknowledgments 930 field. After performing step 1375, execution of the process 1300 continues to step 1380.

Step 1375 may optionally produce a bill after each successful transmission, may create a new line items in a pending bill which charged an amount for each transmission, or may send a signal to a billing process 136 to perform the billing. The billing process 136 could examine the history log 400 to determine how many portions of a file 112A were sent for a transmission request and generate a bill accordingly.

When the process 1300 determines that a file 112A has not yet been completely transmitted 1370, execution of the process branches directly to step 1380 where the process 1300 will perform a next iteration 1320 of a next history record 450, or end 1390 when all history records 450 have been iterated through.

In a preferred embodiment, process 1300 is executed by the schedule process (128, 134) on a periodic basis, e.g. every five minutes. In alternate embodiments, process 1300 is executed whenever new history records 450 are added to the history log 400, or when a the number of new history records 450 within the history log 400 passes a threshold, e.g. when there are at least twenty new history records 450 in the history log 400.

In addition to writing history records 450 into the history log 400, the dispatching process 600 generates other information which may be used for feedback. As the dispatching process 600 transmits portions of files 112A over the network (150, 159), it modifies the aggregate amount of network use 515 fields of network use criteria records 550. These modified network use criteria records 550 are used by the schedule dispatch process 1100, FIG. 11 above, to determine the remaining bandwidth 530 during a time period.

The dispatching process 600 also updates the cursor field 315 of file list records 350 as it transmits portions of their associated files 112A. The cursor field 315 is used by process 1100, step 1125, and process 1200, step 1235, to determine the quantity of file 112A data which needs to be transmitted. As portions of the file 112A are transmitted over time for distinct delivery criteria records 914, the cursor field 315 of the delivery criteria records 914 is increased. And, if the schedule dispatch process 1100 is executed after a portion of a file 112A has been transmitted, because the cursor 315 field will have been updated during the portion transmission, the schedule dispatch process 1100 will not try to reschedule that portion.

Referring back to the description of FIG. 8, box 135 is an optional acknowledgment receiver process. This process 135 receives messages (e.g. positive or negative acknowledgments) from clients (160, 170) that indicate successful receipt of a transmission, successful receipt of one or more portions of a transmission; partial receipt of a transmission, and receipt of a transmission with errors (e.g. missing data, damaged data, partial data) in one or more of its portions. Upon receiving acknowledgments (positive or negative), the process 135 examines the associated transmission request 700 and determines if a retransmission of the data file 112A or a portion of the data file 112A is warranted. When the process 135 determines that a retransmission is needed or is no longer needed, it signals the estimate transmissions process 1000 to schedule and/or remove delivery criteria 914 associated with the transmission request 700. The process 135 may also signal the billing process 136 to generate a bill.

Figure 14:
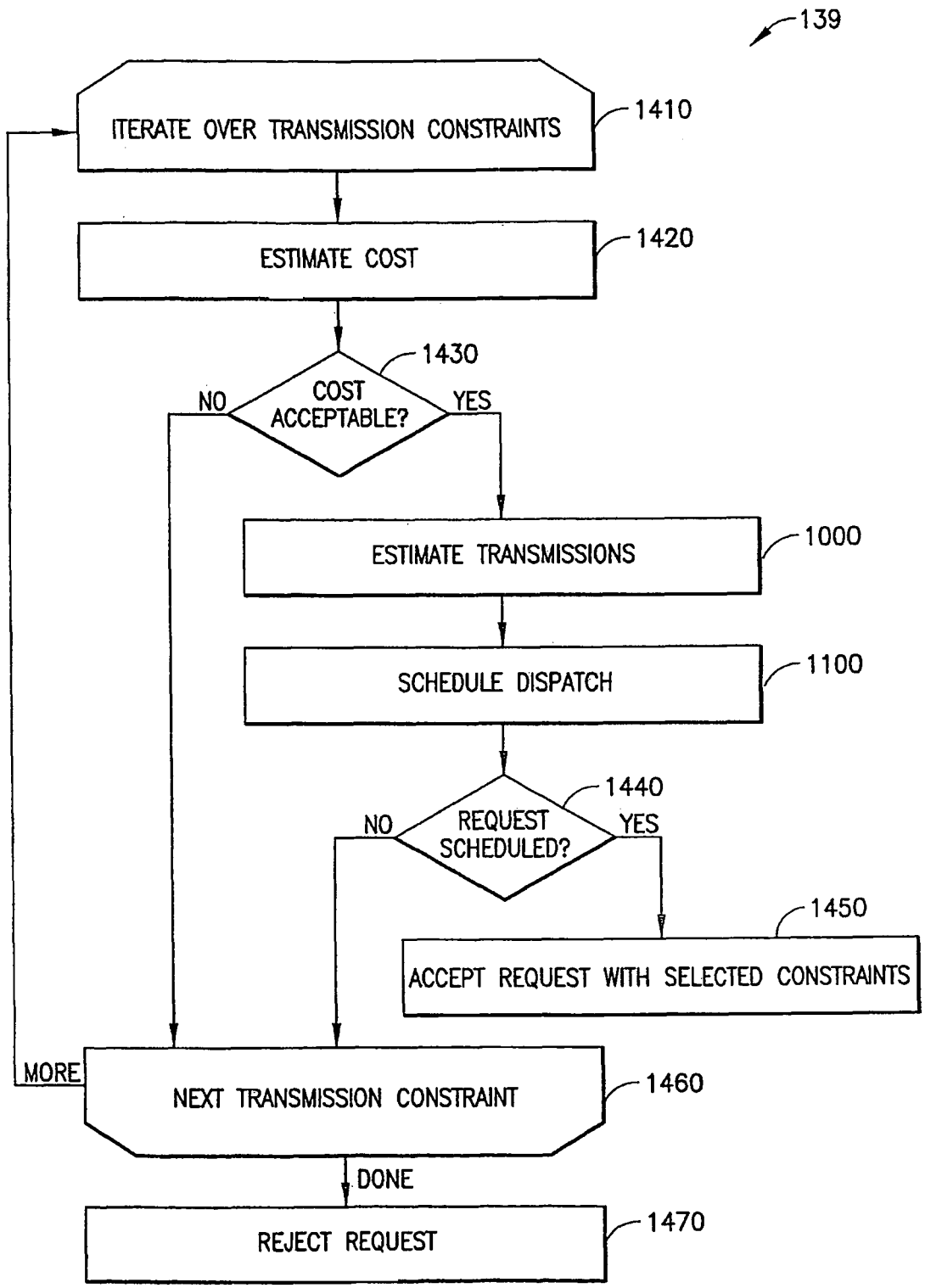
FIG. 14 is a flow chart of an acceptance process.

FIG. 14 is a flow chart of an acceptance process 139 which determines if it is possible to schedule a transmission of the information in the transmission request 700 in accordance to the received transmission constraints 770.

The acceptance process 139 begins, step 1410, by iterating over the transmission constraints 770 in the transmission request 700 received by the request receiver process 144. In a preferred embodiment of the invention, the transmission request 700 contains only one transmission constraint 770. However, in alternate embodiments, the transmission request 700 may contain multiple transmission constraints 770, and each is iterated over in turn by step 1410.

Step 1420 of the process 139 estimates the cost of performing the transmission request 700 in accordance to the selected transmission constraints (770, 1410). The costs of the transmission can be based on many cost factors and fees. Cost factors which relate to the content generator process 146 include: rental of a network connection 157 (a leaded line, an internet connection) between the client 180 and the server 140; an on-line or off-line storage fee to maintain the retrieved files 112A in mass storage 110; a fee relating to the expected data file size 722 of the file 112A being retrieved; a fee relating to the expected length of time taken to retrieve the data file 112A; a fee for preparation work (digitization, encryption) requested by packaging options 720; and a fee for polling the client 180 to retrieve updated data files 112A.

Cost factors which relate to the transmissions of the data file 112A include: a priority based fee; network usage fees based on peak and off-peak transmission release times 742 and transmission deadlines 744; fees based on the amount of leeway between the transmission release time 742 and the transmission deadline 744; number of retransmissions requested (retransmission count 748); and the acknowledgments 760 requested. The cost may also be influenced by the number of recipients 750 which are to acknowledge the transmissions, and their prior reception history. A client 180 may qualify for a discount if all the recipients 750 in a transmission request 770 have a history of excellent reception and retransmissions 748 are not expected to be necessary. A further cost factor may be the type of report offered to the client 180 detailing the transmissions, retransmissions, and itemized success or failure of recipient 750 reception. Other factors which are considered by the billing process 136 may also be estimated by step 1420.

After calculating an estimate of the cost of the transmission, step 1420, the process 139 checks, step 1430, to see if the cost is within the (optional) billing cost 734 amount specified in the transmission request 700. If the estimated cost 1420 is greater than the billing cost 734, execution of the process 139 branches to step 1460 where an iteration of a next transmission constraint 770 is performed.

If the estimated cost 1420 is equal to or less than the billing cost 734 (or if the optional billing cost field 734 was omitted), the process 139 tests the transmission request 700 for, step 1435, other business constraints. For instance, the process 139 may estimate the time required to perform transformations requested in the packaging options field 720 such as encryption or digitization. The transmission request 700 is then checked to see that there is a sufficient amount of time between the retrieval start time 714 and the transmission release time 742 to prepare the file 112A for transmission. The process 139 may also, step 1435, estimate the time required for the content generator process 146 to retrieve the data file 112A, given its estimated data file size 722, and see that there is enough time to retrieve the data file 112A before transmitting it.

In alternate embodiments, the tests of step 1435 are performed before step 1430.

If the transmission request 700 passes the tests of step 1435, the process 139 executes process 1000 to estimate the transmissions which are required to fulfill the transmission constraints 770. The process 139 then executes process 1100 to schedule the transmission. When execution of process 1100 ends with the transmission being successfully scheduled, i.e. it was not dropped (882 and step 1440), the transmission constraint 770 are considered acceptable to the system 100 and the transmission request 700 is accepted, step 1450.

If during execution of process 1100, the transmission is dropped (882 and step 1440), the acceptance process 139 determines that the transmission constraint 770 cannot be scheduled by the system 100. Execution of the process 139 moves to step 1460 where an iteration of a next transmission constraint 770 is performed.

Step 1460 checks the transmission request 700 to see if it contains any transmission constraints 770 which have not yet been iterated over. If so, step 1460 causes execution of the process 139 to branch to step 1410 to perform the next iteration. When all transmission constraints 770 have been iterated over 1410, execution of the process 139 moves to step 1470 where the transmission request 700 is rejected. All candidate transmission constraints 770 have been examined and none have found acceptable, so the transmission request 700 is rejected and a rejection signal is sent to the client 180 by the request receiver process 144. The client 180 can then submit a new transmission request 700 with alternate transmission constraints 770.

In alternate embodiments, the acceptance process 139 marks each transmission constraint 770 with an indication of why it was considered unacceptable. This marking can indicate that a constraint 770 was too costly and not accepted by step 1430, for example. Or the marking can indicate that the cost was sufficient but there was not enough available network use, determined by step 1440, to schedule the transmission request 700. The marked up transmission constraints 770 are returned to the client 180 by the request receiver process 144 and provide the client 180 with information which can be used to negotiate an acceptable transmission request 700.

Alternate embodiments may also return a copy (or a detailed or summarized report) of the network use criteria table (500, 1110) used in the schedule dispatch process 1100, when transmission requests 700 are rejected. This report would let the client 180 know when the network has available bandwidth and would let the client 180 fine-tune a next transmission request 700 that would be more acceptable.

Further embodiments of the acceptance process 139 may execute processes 1000 and 1100 for transmissions to be performed in the near-term only (e.g. within one week), and perform an alternate acceptance test for long-term transmissions. This alternate test would be used to roughly forecast the network bandwidth availability.

In a non-limiting example, a subscriber, such as a software provider (client 180), wants to provide software updates to its network (150, 159) connected customers (160, 170). The software provider sends a transmission request 700 to the request receiver process 144. The file 112A containing the software updates is 100 megabytes long. The connected customers (e.g. recipients 750) can receive at speeds up to 128 kilobits per second (e.g. bandwidth constraints 752). The software provider requests (through packaging options field 720) that the software updates be encrypted and digitally signed. The software provider also requests (through acknowledgments field 760) that each recipient 750 acknowledge receipt of the file 112A. The software provider specifies a retrieval start time 714 of 08:00 AM, a transmission release time 742 of 08:30 AM, and a transmission deadline 744 of 09:00 AM.

The request receiver process 144 receives the software provider's transmission request 700 and passes it to the acceptance process 139. The acceptance process 139 rejects the transmission request 700 because the content generator process 146 requires at least forty-five minutes to retrieve the data file 112A, encrypt it, and sign it (rejection due to failure of tests in step 1435); and because (rejection due to failure in step 1440) the 100 megabyte file 112A cannot be transmitted in thirty minutes at 128 kilobits per second.

After the transmission request 700 is rejected by acceptance process 139, the request receiver notifies the software provider (client 180) of the rejection and indicates the minimal time requirements needed to satisfy the tests of step 1435 and 1440. A person at the software provider submits a second transmission request 700 with a transmission release time 742 of 11:00 AM and a transmission deadline 744 of 02:30 PM. This second transmission request 700 is accepted by process 139.

Referring now to FIG. 8, an additional action taken 888 is for the delivery status module 137 to notify the acceptance process 1440 when a delivery criteria record 914 associated with a candidate transmission constraint (1410, 770) was dropped.

Alternative embodiments of the system architecture 800 may include multiple scheduler processes (128, 134), request receiver processes 144 and acceptance processes 139, content generators 146, dispatch processes 600 (600A, 600B), acknowledgment receiver processes 135, and delivery status modules 137, communicating with each other. One request receiver process 144 may act as a broker and forward a received transmission request 700 to multiple acceptance processes 139 in an attempt to have a transmission request 700 accepted at a preferred billing rate or transmission criteria 770. If a first acceptance process 139 rejects the transmission request 700, the request 700 would be passed by the request receiver broker 144 to a second acceptance process 139 which may be connected to a system 100 which offers better rates or have more available bandwidth.

A broker request receiver process 144 may also break a transmission request 700 into two or more new transmission requests 700 which may be accepted, rejected, and/or serviced independently. For example, suppose a company wishes to deliver a digitized video of a product announcement to people who have registered on its mailing list. The recipients for the product announcement may include satellite connected users (e.g. 160), terrestrial users (e.g. 170) connected to the Internet Multicast Backbone (M-Bone), and terrestrial users (e.g. 170) connected to the Internet via America On-Line (AOL). The company may create a transmission request 700 which lists all of its users and send the request 700 to a broker request receiver process 144. This broker request receiver process 144 may generate three transmission requests 700, the request 700 listing the satellite connected users, the M-Bone connected terrestrial users, and the AOL users, in the recipients 750 field, respectively. The broker request receiver process 144 would then submit the new transmission requests 700 to acceptance processes 139 which were connected to the appropriate networks (150, 159).

A broker request receiver process 144 may also break a transmission request 700 into two or more new transmission requests 700 by other means (besides recipient 750 network 150,159 connectivity). For instance, a broker request receiver process 144 which receives a transmission request 700 asking for a retransmission 748 may generate two transmission requests 700, each asking for zero retransmissions 748. In essence, the broker request receiver process 144 performs a negotiation process with one or more acceptance processes 139 on behalf of a client 180.

Other businesses processes may also be built around the system 100. A company may wish to have data files on its agent computers synchronized with a central data source. Each time a file 112A changes at the central data source (client 180), a transmission request 700 could be generated to have the new data file 112A transmitted over the network (150, 159) to the company's agents (160, 170). This file 112A may or may not be encrypted to maintain privacy.

Another company may add a finishing process to the system 100 which receives a transmitted data file 112A and forwards it on a local area network to other network connected clients or performs some other final manipulation. A sample finishing process may be for received data files 112A at a client (160, 170) which contain e-mail messages to be forwarded over a local area network. Or, when received data files 112A contain digitized video, the finishing process may be to convert the files 112A into analog NTSC video for displayed in an auditorium or conference room, or storage on analog video tape.

The system 100 makes it easy to transmit data files 112A to a large number of recipients and provides an assurance that the transmission will take place. And, it provides a way to manage the network (e.g. Satellite network) bandwidth. This easy-to-use system opens the satellite marketplace up to many new business opportunities. Small to midsize businesses can now transmit their digital information over the satellite easily and economically.

Given this disclosure alternative equivalent embodiments will become apparent to those skilled in the art. These embodiments are also within the contemplation of the inventors.

We claim:

1. A method comprising:
   receiving, at a receiver, a request for transmitting digital information, the request comprising transmission constraints, the transmission constraints comprising a start time indicating a time after which a transmission of the digital information is to begin and an end time indicating a time by which the transmission of the digital information is to be completed, the digital information comprising a number of packets;
   calculating, by a processing unit, an estimated time required to transmit the digital information based on the number of packets and a network speed;
   scheduling, by the processing unit, a transmit time for the transmission of the digital information based upon at least the start time, the end time, and the estimated time required to transmit;
   determining whether the estimated time required to transmit is less than or equal to the difference between the transmit time and the end time;
   in response to a determination that the estimated time required to transmit is less than or equal to the difference between the transmit time and the end time, accepting, by the processing unit, the digital information for transmission; and
   in response to a determination that the estimated time required to transmit is more than the difference between the transmit time and the end time, rejecting, by the processing unit, the digital information for transmission,
   where calculating, scheduling and determining are performed prior to the transmission of the digital information.

2. A method, as in claim 1 where the digital information is transmitted at a first price.

3. A method as in claim 1, where the request is a first request and further comprising in response to the digital information being rejected for transmission, receiving, at the receiver, a second request for transmitting the digital information, the second request comprising alternate transmission constraints.

4. A method as in claim 3, where the transmission constraints of the first request comprise a first price, the alternate transmission constraints of the second request comprise a second price different from the first price and the digital information is accepted for transmission at the second price.

5. A method as in claim 1, where the digital information is rescheduled and accepted for transmission at a second price after the information is rejected.

6. A method as in claim 1, further comprising receiving an acknowledgment of the transmission.

7. A method as in claim 6, further comprising producing a bill on receipt of the acknowledgment.

8. A method as in claim 1, where one or more portions of the digital information are accepted for transmission and are transmitted.

9. A method as in claim 8, further comprising receiving an acknowledgment of the transmission of one or more of the portions.

10. A method as in claim 9, further comprising producing a bill on receipt of the acknowledgment for one or more of the portions.

11. A method as in claim 1, where one or more portions of the digital information are initially rejected and then accepted for transmission at one or more second times and at one or more second prices.

12. A method as in claim 1, where the request has one or more priorities.

13. A method as in claim 12, where the priority is that the digital information is transmitted within a time period.

14. A method as in claim 13, where the time period is at least one of: over night, two days, and one week.

15. A method as in claim 12, where the priority is a freight priority that requires the digital information to be transmitted within a freight time period with no acknowledgments.

16. A method as in claim 1, where the digital information is scheduled for one or more retransmissions if the estimated time required to transmit is more than the difference between the estimated transmit time and the end time.

17. A method as in claim 1, where the digital information is scheduled for one or more retransmissions if no acknowledgment of the transmission of the digital information is received.

18. A method as in claim 1, where the digital information is also not transmitted if one or more criteria are not met.

19. A method as in claim 18, where the criteria include any one or more of the following: a file size, a release time, a deadline, one or more recipients, one or more user locations, an acknowledgment, a negative acknowledgment, a partial acknowledgment, a bandwidth, a quality of service, a retransmission count, and a retransmission schedule.

20. A method as in claim 1, wherein the request further includes information from a client regarding how the client can be billed.

21. A method as in claim 20, wherein the information from the client comprises an account identifier and further comprising billing a determined cost to the account identified by the account identifier.

22. A method as in claim 1, further comprising:
   in response to transmitting the digital information, determining whether the transmission was successful; and
   in response to a determination that the transmission was determining whether a cost for transmission has exhausted an amount of a maximum cost, and in response to the cost for transmission not exhausting the amount of maximum cost, retransmitting the digital information.

23. A method as in claim 1, wherein:
   the request further comprises at least one item from the following: an expected data file size, a retransmission count, a transmission release date, a transmission deadline, and selected acknowledgments.

* * * * *